US010585981B2

(12) United States Patent
Issa

(10) Patent No.: US 10,585,981 B2
(45) Date of Patent: Mar. 10, 2020

(54) METHOD OF DATA CAPTURE, STORAGE AND RETRIEVAL THROUGH USER CREATED FORM TEMPLATES AND DATA ITEM TEMPLATES BY EXECUTING COMPUTER-EXECUTABLE INSTRUCTIONS STORED ON A NON-TRANSITORY COMPUTER-READABLE MEDIUM

(71) Applicant: Samir Issa, Ottawa (CA)

(72) Inventor: Samir Issa, Ottawa (CA)

( * ) Notice: Subject to any disclaimer, the term of this patent is extended or adjusted under 35 U.S.C. 154(b) by 156 days.

(21) Appl. No.: 15/396,228

(22) Filed: Dec. 30, 2016

(65) Prior Publication Data

US 2017/0109341 A1 Apr. 20, 2017

Related U.S. Application Data

(63) Continuation-in-part of application No. 14/297,929, filed on Jun. 6, 2014, now abandoned, and a continuation-in-part of application No. 14/987,753, filed on Jan. 4, 2016, which is a continuation-in-part of application No. 13/613,233, filed on Sep. 13, 2012, now abandoned.

(51) Int. Cl.
*G06F 17/24* (2006.01)
*G06F 17/30* (2006.01)
*G06F 9/44* (2018.01)
*G06F 16/83* (2019.01)
*G06F 16/28* (2019.01)

(52) U.S. Cl.
CPC .......... *G06F 17/243* (2013.01); *G06F 16/289* (2019.01); *G06F 16/83* (2019.01)

(58) Field of Classification Search
CPC .. G06F 17/2211; G06F 17/248; G06F 17/243; G06F 9/451; G06F 8/34; G06F 8/315
See application file for complete search history.

(56) References Cited

U.S. PATENT DOCUMENTS

| 6,938,021 | B2* | 8/2005 | Shear | G06Q 20/3674 |
| | | | | 705/67 |
| 7,095,854 | B1* | 8/2006 | Ginter | G06F 21/10 |
| | | | | 380/231 |
| 7,533,366 | B2* | 5/2009 | Gupta | G06F 8/24 |
| | | | | 717/105 |

(Continued)

*Primary Examiner* — Stephen S Hong
*Assistant Examiner* — Ahamed I Nazar

(57) ABSTRACT

In a method of operating a software engine for storing, organizing and reporting data in an organizational environment through user created templates and data items, users can build highly customizable templates for data and web forms for data entry, with many different specifiable attributes. Related data is linked and can be queried for retrieval. Users can design, create, add, and use unlimited number of forms, reports, business processes, and queries without any additional programming. Metadata objects (mobjects) and data items (ditems) are created by an administrator. Mobject templates are form templates that are rendered into web forms by a render module, and ditem templates are inputs and controls on the web forms. The schema of the production database remains unchanged regardless of user interaction with the system, thus providing a highly customizable data storage and organization system for any business environment.

12 Claims, 21 Drawing Sheets

(56) References Cited

U.S. PATENT DOCUMENTS

| | | | | |
|---|---|---|---|---|
| 8,141,033 B2* | 3/2012 | Gupta | ..................... | G06F 8/24 717/105 |
| 8,166,454 B2* | 4/2012 | Gupta | ..................... | G06F 8/24 717/105 |
| 8,499,279 B2* | 7/2013 | Gupta | ..................... | G06F 8/24 717/105 |
| 2003/0229900 A1* | 12/2003 | Reisman | ........... | G06F 17/30873 725/87 |
| 2004/0031058 A1* | 2/2004 | Reisman | ........... | G06F 17/30873 725/112 |
| 2005/0060684 A1* | 3/2005 | Gupta | ..................... | G06F 8/24 717/105 |
| 2006/0107197 A1* | 5/2006 | Friend | ..................... | G06F 17/243 715/223 |
| 2006/0179404 A1* | 8/2006 | Yolleck | ................. | G06F 17/243 715/272 |
| 2006/0224948 A1* | 10/2006 | Desmond | .............. | G06F 17/243 715/207 |
| 2008/0097769 A1* | 4/2008 | Galvin | .................. | G06Q 30/02 705/346 |
| 2008/0120129 A1* | 5/2008 | Seubert | .................. | G06Q 10/06 705/35 |
| 2008/0231429 A1* | 9/2008 | Leonard | ................. | G06F 17/248 340/146.2 |
| 2008/0275910 A1* | 11/2008 | Molina-Moreno | ....... | G06F 8/35 |
| 2009/0024942 A1* | 1/2009 | Pendergast | ............ | G06F 3/1204 715/764 |
| 2009/0037502 A1* | 2/2009 | Gupta | ..................... | G06F 17/243 |
| 2009/0037874 A1* | 2/2009 | Gupta | ..................... | G06F 8/24 717/105 |
| 2010/0076947 A1* | 3/2010 | Kurapat | ............ | G06F 17/30321 707/706 |
| 2011/0197119 A1* | 8/2011 | Ye | ......................... | G06Q 30/08 715/226 |

* cited by examiner

MOBJECT ATTRIBUTES

| | Mobject Attribute Name | State One, XML FILE ON TEMPLATE DB | State Two, XML FILE ON ASPX TEMPLATE DB | State Three, XML FILE ON PRODUCTION DB |
|---|---|---|---|---|
| 1 | ID (PK) | LNG | No change | System provided |
| 2 | Annotation | NULL | NULL | User Input |
| 3 | aspxString | NULL | ASPX String | NON EXISTENT |
| 4 | CanAddDitem | TB Power User sets BLN value | No change | NON EXISTENT |
| 5 | CanEdit | TB Power User sets BLN value | No Change | NON EXISTENT |
| 6 | CanIncreaseInLength | TB Power User sets BLN value | No change | NON EXISTENT |
| 7 | Category | TB Power User sets STR value | No change | No Change |
| 8 | Code | TB system provided value | No change | No Change |
| 9 | CreationDate | TB system provided value | No change | NON EXISTENT |
| 10 | Creator | TB system provided value | No change | NON EXISTENT |
| 11 | Consumed | FALSE | TRUE(after instantiation) | NON EXISTENT |
| 12 | GeneratingUser | TB system provided value | No change | No Change |
| 13 | GeneratingWorkGroup | TB system provided | No change | No Change |
| 14 | HL7Class | TB Power User sets STR value | No change | No Change |
| 15 | IsGenUsrSpecific | TB Power User sets BLN value | No change | No Change |
| 16 | IsInterruptible | TB Power User sets BLN value | No change | No change |
| 17 | IsTargetUsrSpecific | TB Power User sets BLN value | No change | No Change |
| 18 | Journaled | NULL | No change | No Change |
| 19 | LastUpdateDate | NULL | NULL | System provided |
| 20 | Locked | FALSE | No change | System provided |
| 21 | MobjectClass | TB Power User sets STR value | No change | No Change |
| 22 | MobjectType | TB Power User sets STR value | No change | No Change |
| 23 | Obsolete | FALSE | No change | NON EXISTENT |
| 24 | OwnerAppDomain | TB Power User selectable STR | No change | No Change |
| 25 | OwnerAppName | TB Power User selectable STR | No change | No Change |
| 26 | OwnerAppObjectGUID | NULL | NULL | System provided |
| 27 | OwnerAppObjectName | TB Power User selectable STR | No change | No Change |
| 28 | OwnerOrganization | TB system provided value | No change | No Change |
| 29 | Ready | FALSE | READY | NON EXISTENT |
| 30 | RequestPin | TB Power User sets BLN value | No change | NON EXISTENT |
| 31 | SectionHeads | TB Power User builds XML string of SectionHeads attribute | No change | NON EXISTENT |
| 32 | SequenceImperative | TB Power User sets BLN value | No change | NON EXISTENT |
| 33 | TargetUser | TB Power User selectable STR | No change | No Change |
| 34 | TargetWorkGroup | TB Power User selectable STR | No change | No Change |
| 35 | Title | TB Power User sets STR value | No change | NON EXISTENT |
| 36 | TitlePart | TB Power User selectable STR | No change | NON EXISTENT |
| 37 | TemplateID | Duplicates the Primary Key | No change | No change |
| 38 | Updater | TB system sets to nil | No change | System provided |
| 39 | Value | TB Power User sets STR value | No change | No Change |
| 40 | Verified | FALSE | No change | System provided |
| 41 | VerifyingUser | TB system set to nil | No change | System provided |
| 42 | xmlString | XML MOBJECT | Could change if power user adds Ditem values | NON EXISTENT |
| 43 | XDescriptors | NULL | XML STRING | XML STRING |
| 44 | YDescriptors | NULL | XML STRING | XML STRING |

FIG. 6

Ditem States

Ditems attributes can take one of three states according to the location of the XML file that represent the Mobject holding the Ditems. In general, Ditem attributes get less and the Ditem gets 'leaner' as it progresses in its path towards the Production Database. Nevertheless some attributes that are casted on the 'Value' attribute of the Ditem are added to the XML file in order to strongly type and render the Ditem 'Value'

| NO | Ditem Attribute Name | State ONE, XML on TB Database | State Two, XML FILE ON TEMPLATE DB | State Three, XML FILE ON PRODUCTION DB |
|---|---|---|---|---|
| 1 | ID | TB system provided | No change | CA Server Input |
| 2 | Annotation | NULL | No change | TB user in XML Template |
| 3 | CanEdit | TB user provided | No change | No Change |
| 4 | Code | TB system provided | No change | No Change |
| 5 | Consumed | TB system provided | NON-EXISTENT | NON-EXISTENT |
| 6 | CreationDate | TB system provided | NON-EXISTENT | NON-EXISTENT |
| 7 | Creator | TB system provided | NON-EXISTENT | NON-EXISTENT |
| 8 | EditPrivilegeLevel | TB user provided | No change | No Change |
| 9 | Flag | TB system set to False | No change | TB user in XML Template |
| 10 | Imperative | TB user provided | No change | NON-EXISTENT |
| 11 | L2Label | TB user provided | No change | No Change |
| 12 | Label | TB user provided | No change | No Change |
| 13 | Obsolete | TB user set | NON-EXISTENT | NON-EXISTENT |
| 14 | Order | TB user provided | No change | No Change |
| 15 | OwnerMobjectID | NULL | Owner mobject ID | GUID |
| 16 | Ready | TB user-provided | NON-EXISTENT | NON-EXISTENT |
| 17 | ShowAs | TB user-provided | No change | NON-EXISTENT |
| 18 | Title | TB user-provided | No Change | NON-EXISTENT |
| 19 | Updater | TB system provided | NON-EXISTENT | NON-EXISTENT |
| 20 | Value | TB user provided | No change | TB user in XML Template |
| 21 | ViewPrivilegeLevel | TB user provided | No change | No Change |
| 22 | XDescriptor | NULL | System Added Int (If 'Value' updated) | System Added Int (If 'Value' updated) |
| 23 | YDescriptor | NULL | System Added Int (If 'Value' updated) | System Added Int (If 'Value' updated) |
| 24 | TemplateID | TB system provided | No change | No change |
| 25 | OwnerOrgID | TB system provided | No change | System provided |
| 26 | ApplicationObjectValue | NULL | No change | System provided |

FIG. 7

METHOD OF DATA CAPTURE, STORAGE AND RETRIEVAL THROUGH USER CREATED FORM TEMPLATES AND DATA ITEM TEMPLATES BY EXECUTING COMPUTER-EXECUTABLE INSTRUCTIONS STORED ON A NON-TRANSITORY COMPUTER-READABLE MEDIUM

FIELD OF THE INVENTION

The present invention relates generally to data organization. More particularly, the present invention relates to a software engine and method for organizing data in a business domain.

BACKGROUND OF THE INVENTION

In all business domains and transactions, capture of data is done through electronic forms that customarily store data in tables related to forms. A form in that sense, is more or less, a window of the End User to the database table. Usually the tables are designed by mapping business transactions to software objects in what is known as object oriented programming (OOP).

To build an object oriented program, there is a prolonged phase of analysis of the business domain and business transactions, by an expert information engineer, to optimize the architecture to meet End User requirements.

GUI designers strive to meet multi End User needs of access to multiple forms representing business objects, and try to do this in the least possible number of GUI instances i.e. forms/menus/buttons. However, when business objects are numerous due to specific and detailed requirements of the business, this often leads to many forms/menus with visually overloaded designs. As a result, complicated GUI requires significant training and long usage before achieving a satisfactory return on time investment of both the End User and the organization.

Furthermore, if End User requirements change for any reason, adopting that change requires always analysis of the new requirements, integration with the changes with previous design, and certainly significant code writing and backend changes in the database. Often times, such changes are hard to obtain because they have a significant financial and logistic overhead. End Users usually try to live with the shortcomings of the software even though this would impact productivity.

An Object Oriented Program targets a specific business domain with specific End User needs. In a multidisciplinary enterprise, different End User requirements lead to the creation of multiple applications; however, enterprises need certainly includes queries that span information acquired in more than one application; and interconnecting those applications to meet those needs resulted in the creation of what is known as ERP systems—Enterprise Resource Planning applications—ERP systems transact with a single database serving several applications with many tables. ERP programs are out of the reach of small to medium sized enterprises, entail significant initial programming, and exhausting End User training. Even so, any change of End User requirements means significant programming and integration overhead.

There is still room for improvement in the art. Therefore, it is the object of the present invention to provide a software engine that enables end users to design, create and use an unlimited number of different types of forms, reports, and queries over a computer network. The advantage the present invention provides over current systems is that the database definition does not restrict forms, so that an increase in the number of forms does not affect the structure of the database. The schema definition of the backend database is static regardless of the number or structure of forms that operate and transact against it, and users of the current invention do not have to write any programming code to upsize or change the application.

BRIEF DESCRIPTION OF THE DRAWINGS

FIG. 6 is an example mobject table.

FIG. 7 is an example ditem table.

FIG. 15b is a continuation of FIG. 15a.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a data value-centered programming method and software engine for the capture, storing, organizing and reporting data in an organizational environment through user created templates and data items that enables end users to design, create and use an unlimited number of different types of forms, reports, and queries over a computer network. The present invention is a data capture, storage and retrieval software system that handles data generated during business domain transactions. The present invention can be tailored to meet the business rules of certain domains by designing its templates on a customized basis.

In this document, the term "end user" refers to a computer user who does not have any programming or coding knowledge. The term "environment" refers to the computer state-definition of the organization that is making use of the invention. The term "business domain" refers to any of the different business domains that uses software to record business transaction. Examples of business domains include, but are not limited to: health services provision, student education, customer relations management, and vehicle manufacturing. A "software application" or "application" is a compiled code that executes specific functions built to meet specific end user requirements and is immediately available, without further coding required from end users. A "software engine" or "engine" is a compiled code that executes generic computer functions that are built to meet generic end user or environment requirements, and is immediately available, without further coding required from end users. A "programming method" or "programming application" is a software application that helps software programmers to design and encode a software application.

Figure 1:
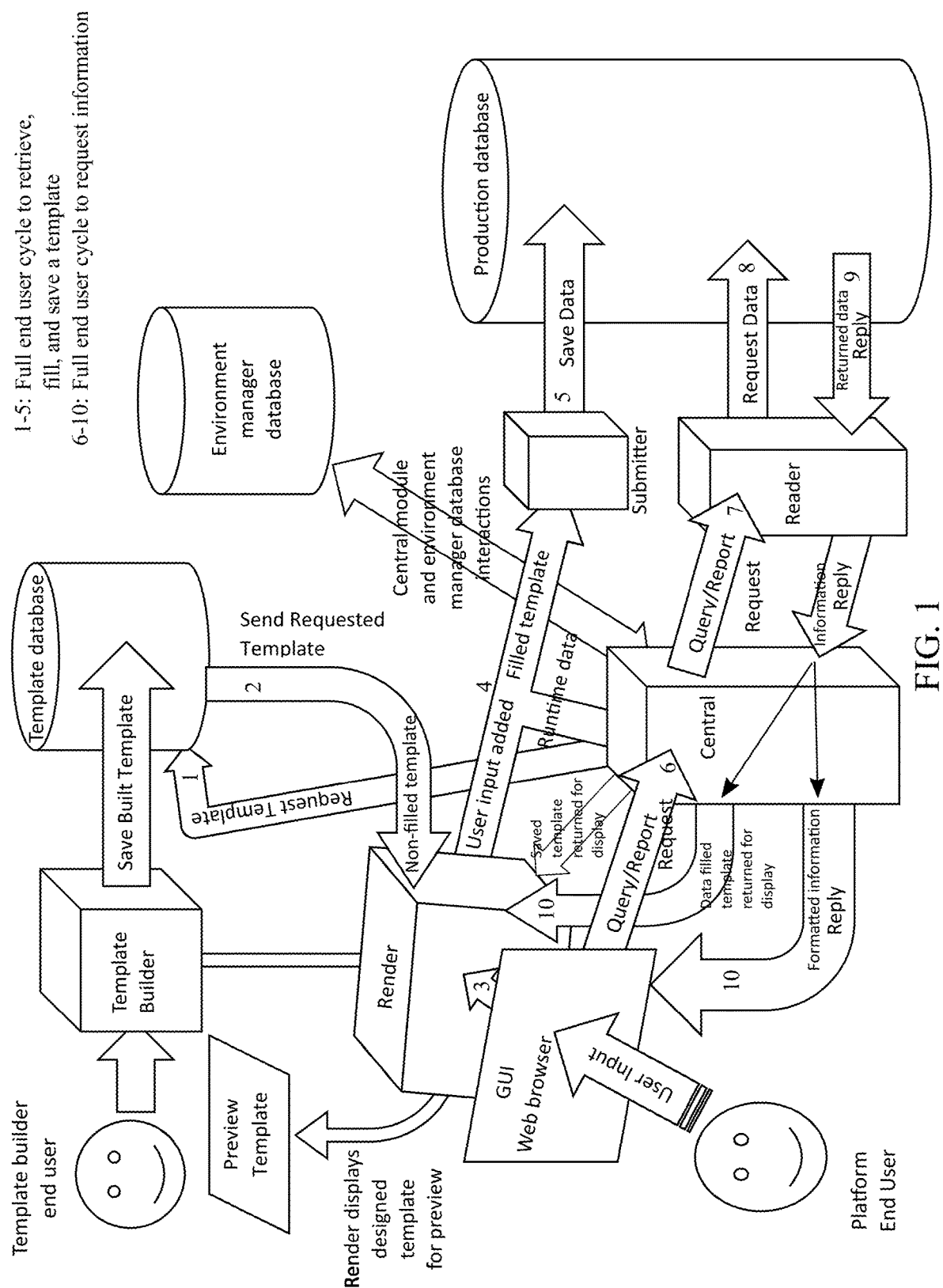
FIG. 1 is a functional diagrammatic overview of the present invention.

The present invention relates to a software engine that employs several software modules that enable an environment's end user to design, create, and use an unlimited number of different types of forms, reports, and queries over a network or the web. The present invention is claimed hereinafter as a method of operating the software engine, but is additionally disclosed and described herein as a software engine in its implementation. The method steps claimed do not necessarily directly reflect any specific coding or other implementation details of the present invention, rather the general logical process of facilitating the operation of the software engine. A general diagrammatic overview of the engine of the present invention is shown in FIG. 1.

In a general overview of the present invention, a template builder module or application allows an end user to build computer-readable templates within a digital environment for any desired purpose. The templates are extremely versatile and may be built with any number or structure of data inputs, web controls, rules, user restrictions, executable instructions, or other attributes. Once built, a template is stored in a template database, from which it can be retrieved for use. An end user may retrieve the template by requesting it through a graphical user interface (GUI). The template is rendered as a web form on the GUI, and the end user inputs values and otherwise interacts with the web form. The web form receives runtime data when the end user saves or submits the web form, and the newly acquired data is bundled and stored in a production database. Data is related in the production database in numerous ways, and the database can be queried to show an end user desired data ranges and/or relations.

The special features that make the present invention stand out compared to existing art are that the present invention can be implemented in any organization of any size, type, and field of activity without any additional programming. Users can design, create, add, and use unlimited number of forms, reports, business processes, and queries without any add-on programming. No back-end database changes are required to accommodate front-end changes such as adding or changing forms, reports, business processes, or queries. The advantage the present invention provides over current systems is that the database definition does not restrict forms, so that an increase in the number or structure of forms does not affect the structure of the database. The schema definition of the backend database is static regardless of the number of forms that operate and transact against it, and users of the current invention do not have to write any programming code to upsize or change the application. The database is stable regardless of the number of forms.

Each of the steps in the method of the present invention carries an engine-specific transformation in the state of data from its occurrence to retrieval; the uniqueness of the present invention is that transformations are independent of any changes in data nature, structure, or format at both the occurrence-capture end and the storage-retrieval end. This independency eliminates the need of programming in order to accommodate business requirements or rules changes.

Figure 2:
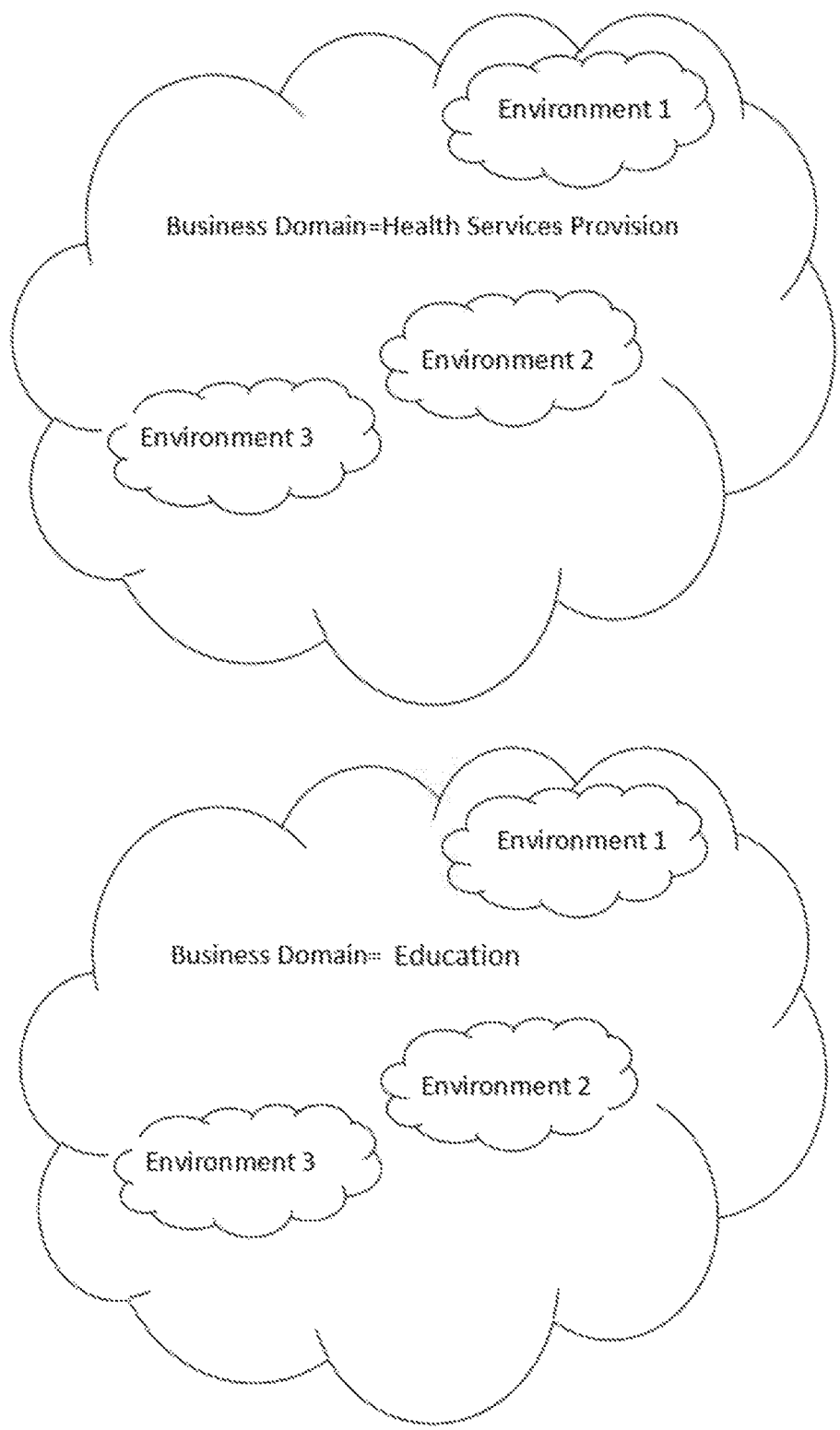
FIG. 2 is an illustration of a multiple business domains in the context of the present invention.
Figure 3:
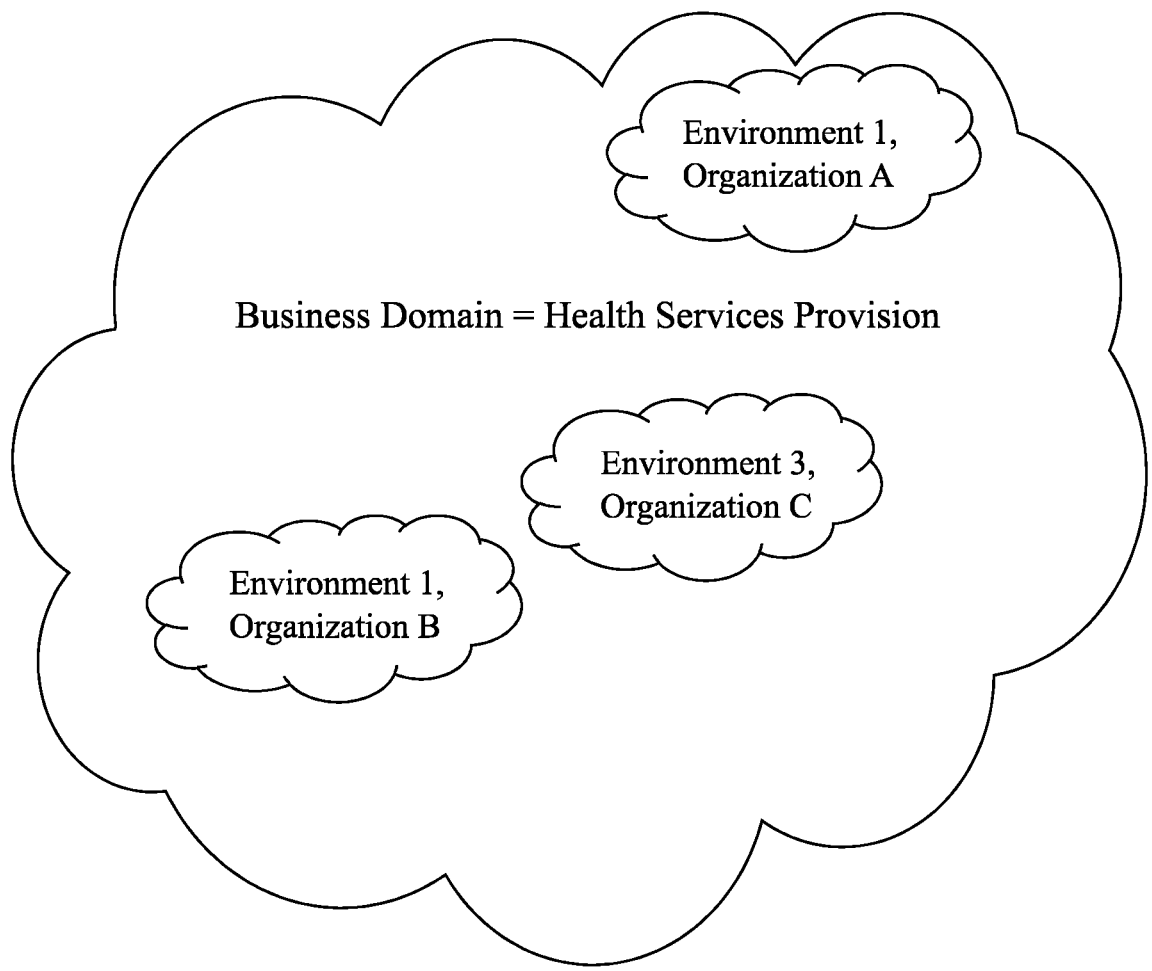
FIG. 3 is an illustration of a business domain in the present invention.

Referring to FIGS. 2-3, the environment of the present invention is defined in order to make the software engine of the present invention meaningful by operating within a business environment. A digital environment, or business environment, or simply environment, generally will refer to the computer state-definition of a singular organization or business making use of the present invention. Within the environment, entities can be defined. Entities can be, but are not limited to, persons, devices, places, or groups. Each person in an environment is an entity but can be associated with several roles. For example, a person in a doctor role may also be in a patient role, a chairman role, or another role. Instances of roles can be linked to each other in the environment database. A given entity A with the role of patient will be linked in the environment with another entity B with the role of doctor, where B is the doctor in charge of patient A. A self-reflecting relation table is utilized between role instances.

There are two types of templates in the present invention as programmatic objects: data item (ditem) templates, and metadata object (mobject) templates. Ditem templates and mobject templates refer to the initial state of a template before being updated with end user values and runtime values. The terms ditem and mobject, on the other hand, refer to instances of templates already saved in the production database and containing end user input and runtime values. The input to define the plurality of programmatic objects is received from the administrator account through the GUI of the template builder module. Furthermore, in the preferred embodiment, each of the plurality of programmatic objects is defined as a plurality of extensible markup language (XML) templates with the template builder module, and the plurality of XML templates are stored in the template database.

A ditem is essentially a piece of data with other attributes. Ditem templates acquire a value to their "Value" attribute and are born as ditems in the context of a transaction. A transaction is the process of retrieving a template from the template database, filling it, and submitting it to the production database. Ditems may include several types of attributes: descriptive attributes, which are used to specify the ditem's datatype, its name, its display name, its creation date, or to qualify its numeric values. Ditems may have relational attributes, such as unique code or a related mobject identifier. Ditems may also have GUI and display related attributes, such as shape and display in various language, among other display attributes. Ditems may have attributes related to validation of the value, such as, but not limited to, value data type, and limitations on the value. Ditems may have attributes related to the source of a value: if it's a direct end user input, an externally fetched value, a calculated value, or from a provided drop-list, or elsewhere. Ditems may have processing attributes, such as, but not limited to, date/time of value edit, if the ditem has been consumed or not, its order on a web form, its state of imperativeness on the container web form, and so on. Further ditem attributes are described further on herein.

Figure 4:
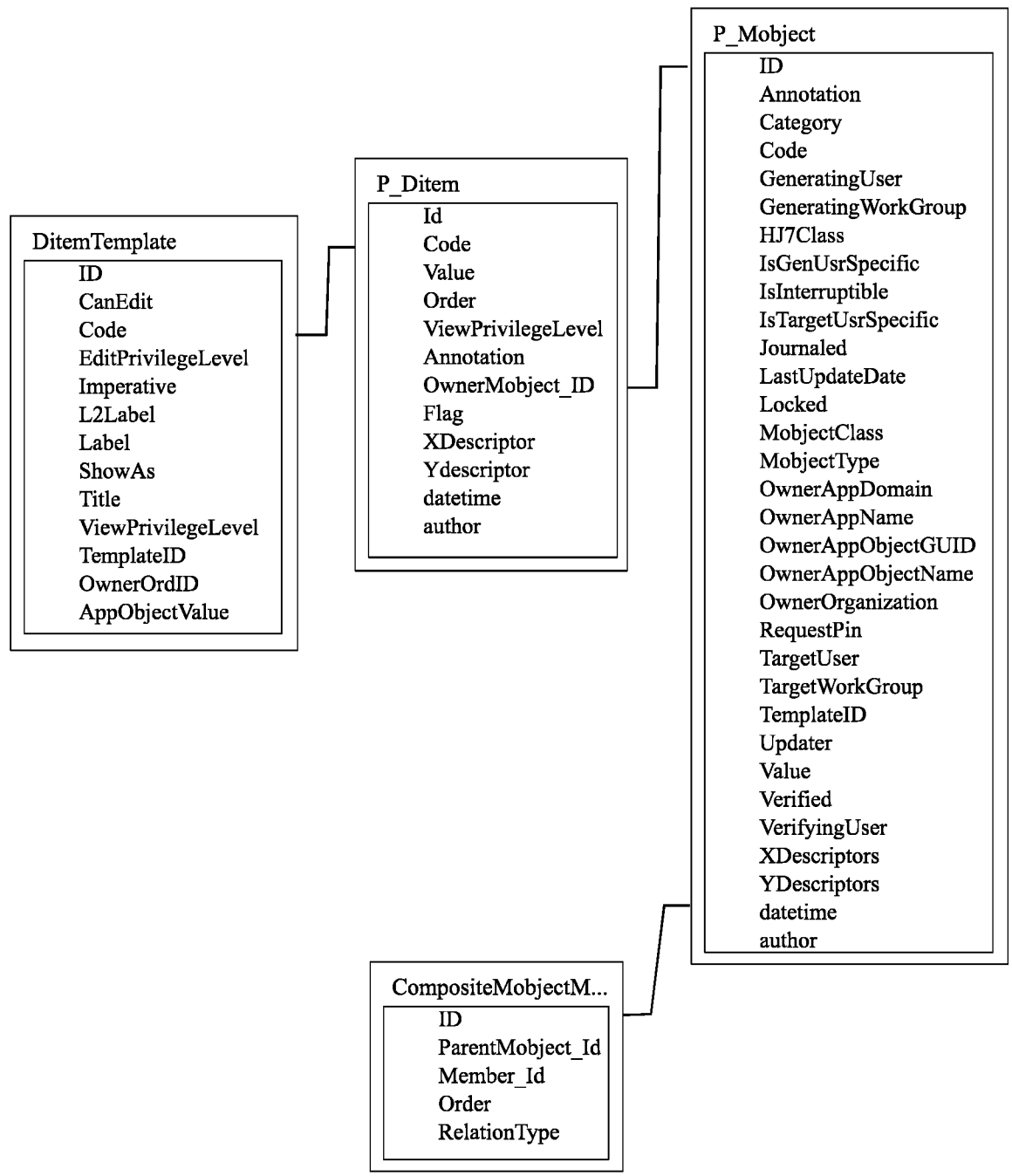
FIG. 4 is shows an example schema for the production database.
Figure 5:
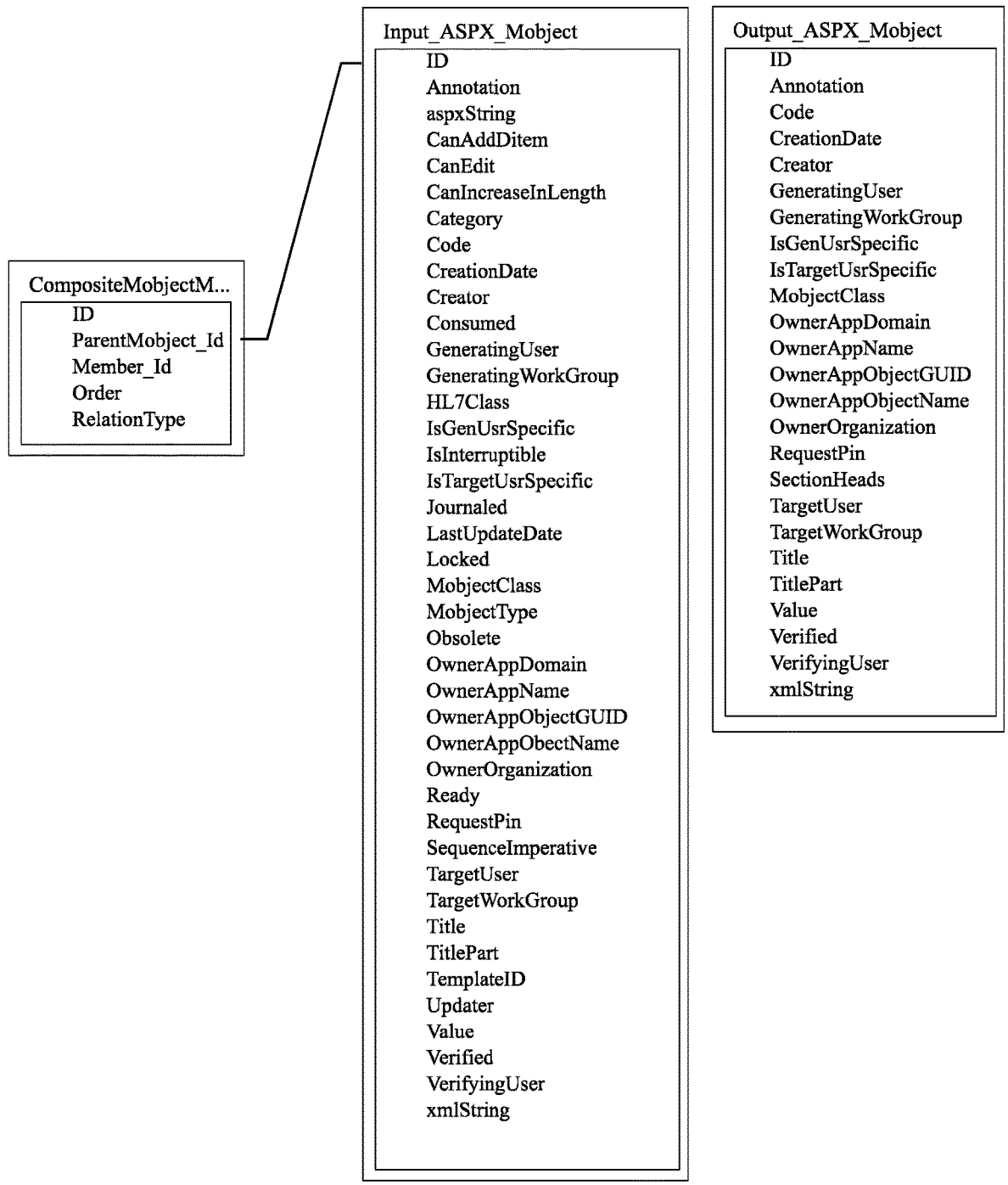
FIG. 5 is a continuation of FIG. 4.

In the preferred embodiment of the present invention, the production database has a fixed table-definition that does not change regardless of the number of feeding forms or executed reports/queries. FIGS. 4 and 5 show examples of the schema of the production database in the preferred embodiment of the present invention. The production database can be implemented by any industrial-strength database engine. In one embodiment, the production database has as a fixed table-definition of three tables:

A mobject table of the production database stores the state of set of attributes of mobjects reflecting end user input and runtime processing. An example mobject table is shown in FIG. 6.

A ditem table stores the state of the set of attributes of ditems reflecting end user input and runtime processing values. An example ditem table is shown in FIG. 7.

A mobject link table stores relations between instances of stored mobjects. This table is updated during runtime processing according to a set of rules that define a certain state of mobject sequence during runtime. For example, mobjects can be linked to each other, and each time one mobject is opened or otherwise operated on by the system, another mobject may also be changed or retrieved, and the runtime information for these actions is updated in the mobject link table.

Each of these tables can be interrogated individually or collectively as part of a joint query between mobject-ditem tables.

The "template database" stores the template builder module user-defined templates of web controls, i.e. ditem templates and mobject templates in two tables:

A mobject template-table stores the definition of all defined mobject templates.

A ditem template table stored the definition of all defined ditem templates.

The template builder module processes a mobject definition with a set of ditem definitions to produce an XML file that represents a combined mobject and its set of ditems. A third table in the "template database" is an "XML-template" table that stores the XML files and makes them readily available to the central module to be processed by it, or by the render module to produce web forms, reports, queries, or processes.

Mobject templates are XML templates of forms, queries, and reports used to submit, store query, and report data. Mobjects are mobject templates that have been filled with user input values and runtime data. Mobject templates have unfilled ditem templates. Filled mobjects have filled ditems, which receive end user input in a transaction.

In the preferred embodiment of the present invention, an attribute of a mobject or an attribute of a ditem can be classified in two ways:

The attribute "use" by the system of the current invention: the value assigned to a mobject's, or ditem s, attribute can be used by the system to make one or more use of the value of that attribute. If an attribute is a classifying attribute, the value of the classifying attribute can be used to classify the mobject or ditem. If an attribute of a mobject or ditem is a display attribute, the value of the display attribute can be used to implement a certain display character. If an attribute of a mobject or ditem is a processing attribute, the value of the processing attribute can be used to perform certain processing instructions.

The attribute "value-assigning stage" by the system of the current invention: Each attribute in the mobject or ditem gains its value at one of the following three stages: Mobject Definition Stage (stored in the mobject-template definition able), XML Template Stage (XML template table), or run-time-filled mobject (stored in production database). Values assigned during the Mobject Definition Stage stay static throughout the remaining stages of the template's life. Values assigned during the XML Template Stage pre-load the mobject definition template with ready like-user-input values. In this way, the template basic definition can be used to produce multiple daughter XML templates from one root definition template; in this case the daughter XML templates are stored under different identifiers in the XML template table. Each of the daughter templates is thus primed with pre-determined values of its ditems simulating a certain user input.

Figure 8:
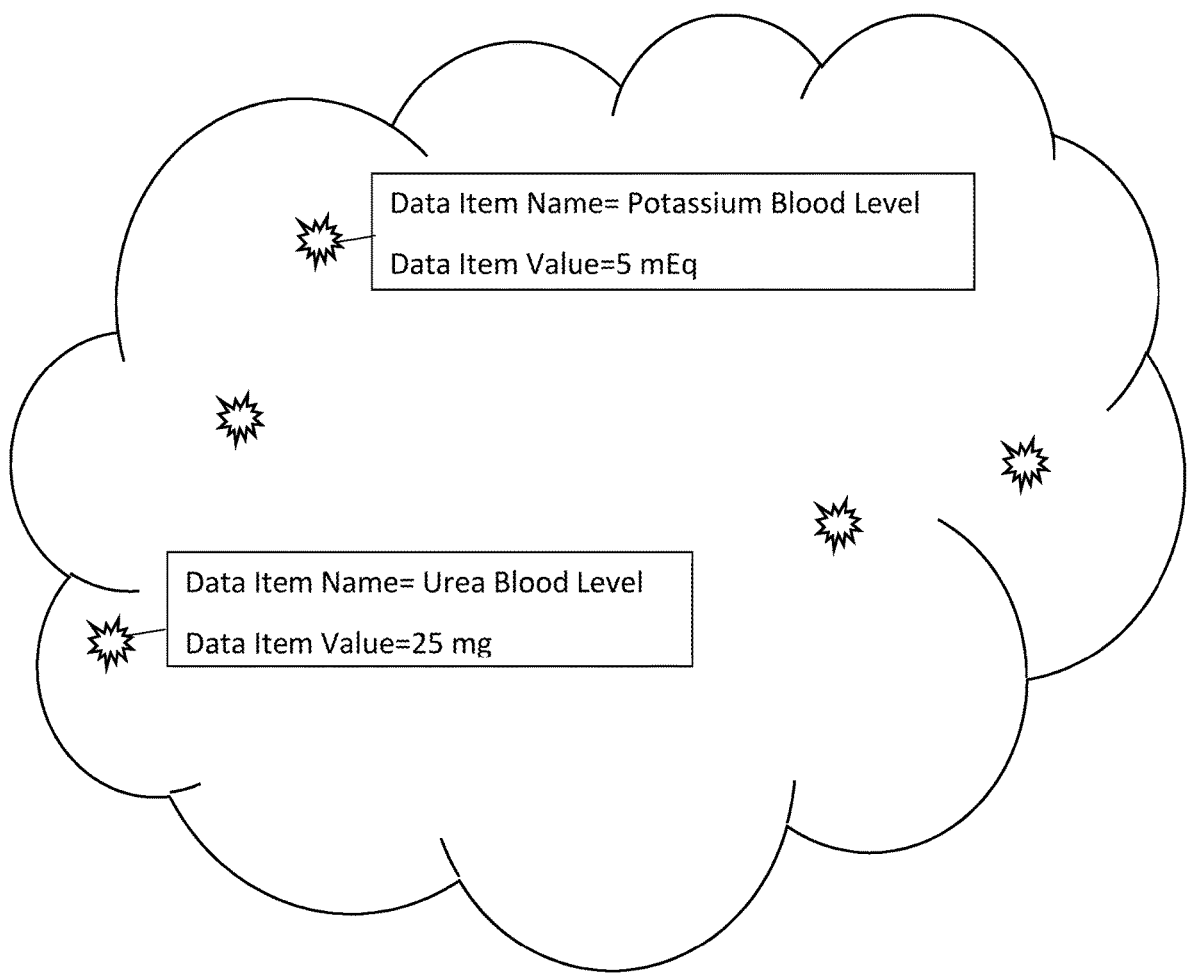
FIG. 8 is an illustration of ditems in a business domain.

In the current invention and in runtime, the first set of run-time values that identify together the context of occurrence of the transaction are captured as runtime attributes of a mobject template. Another set is the group of data items that represent the specific set of values of the "value" attribute of affected data items, i.e. ditems, entered by the end user and captured by the ditems of the mobject. An illustration of data items in a business domain is shown in FIG. 8.

In a transaction example: 'Drawing blood for a complete blood count laboratory test'—in hospital H, nurse N withdraws 5 milliliters of blood from patient P at 3 PM on 1 January for a complete blood analysis ordered by Doctor D. When this transaction happens, some information is new indicating the birth of a one or more, i.e. a set of data item(s), under a repeatable one context of occurrence. The context is the following: Withdrawal of blood for a test of "Complete Blood Count" in hospital H by a licensed laboratory nurse from a patient based on a licensed doctor D request on the date-time DT.

The set of mobject runtime assigned values:
Hospital Name: H, repeatable one context of occurrence
Class of Mobject: Doctor's Order, repeatable one context of occurrence
Sub-Class of Mobject: Laboratory order, repeatable one context of occurrence
Patient ID=P, variable value of occurrence The set of born data items, i.e. the ditems' "Value" values are:
Nurse ID=N, variable context of occurrence
Volume of withdrawn blood=5 with the descriptive qualifier milliliter, variable value of occurrence
Test to be done: Complete Blood Count, variable value of occurrence
Date/Time of occurrence: 3 PM on 1 January, variable value of occurrence
Requesting Doctor=D, variable value of occurrence This example demonstrates the functionality of the present invention in storing and organizing data. As blood withdrawal for a lab test is a frequently repeated transaction in the environment, a mobject-template for "Lab Order" is defined with all the non-changing, repeatable values of context-of-occurrence of ditems such as "Class" or "Subclass of Mobject" and name of hospital. When the mobject template is retrieved to be used in the context of a certain patient, it acquires certain values from the central module such as the Patient ID, User ID, and the date-time. Then, the end user inputs other values pertaining to the event of current use such as: Nurse ID, Volume of Blood, Name of Test. The data items' newly acquired values are stored in the production database and associated with each other and with the context and runtime values, and the whole is also associated with the templates of the mobject and its member ditems. The production database can then be queried in the future for other information related to the above transaction; for example, querying the production database for other transactions in which nurse N, patient P, or doctor D were involved, or for blood withdrawals within a specified date range, or all the lab orders of Doctor D, or all the results of Patient P.

The present invention is preferably embodied and implemented by using web forms on a computer network. An end user, such as a nurse, accountant, or teacher, depending on the business environment, will access the present invention through a computing device by accessing a network address, such as a web site on the internet or a web page on a server associated with the business. The present invention may be programmed in any relevant and useful programming language, such as, but not limited to, HTML, PHP, Perl, Java, JavaScript, XML, JSON, C++, Python, Ruby, or any other programming language that can feasibly be utilized to facilitate the present invention.

The user interface in the preferred embodiment of the present invention is composed of dynamically rendered web pages and web forms comprising web controls such as text boxes, drop-down menus, buttons, and other web controls. The real-world implementation of this method requires no programming or code writing on the part of the end user; therefore, the end user can use it as a generic Enterprise Resource Planning software that has a minimal financial and logistic overhead.

Figure 9:
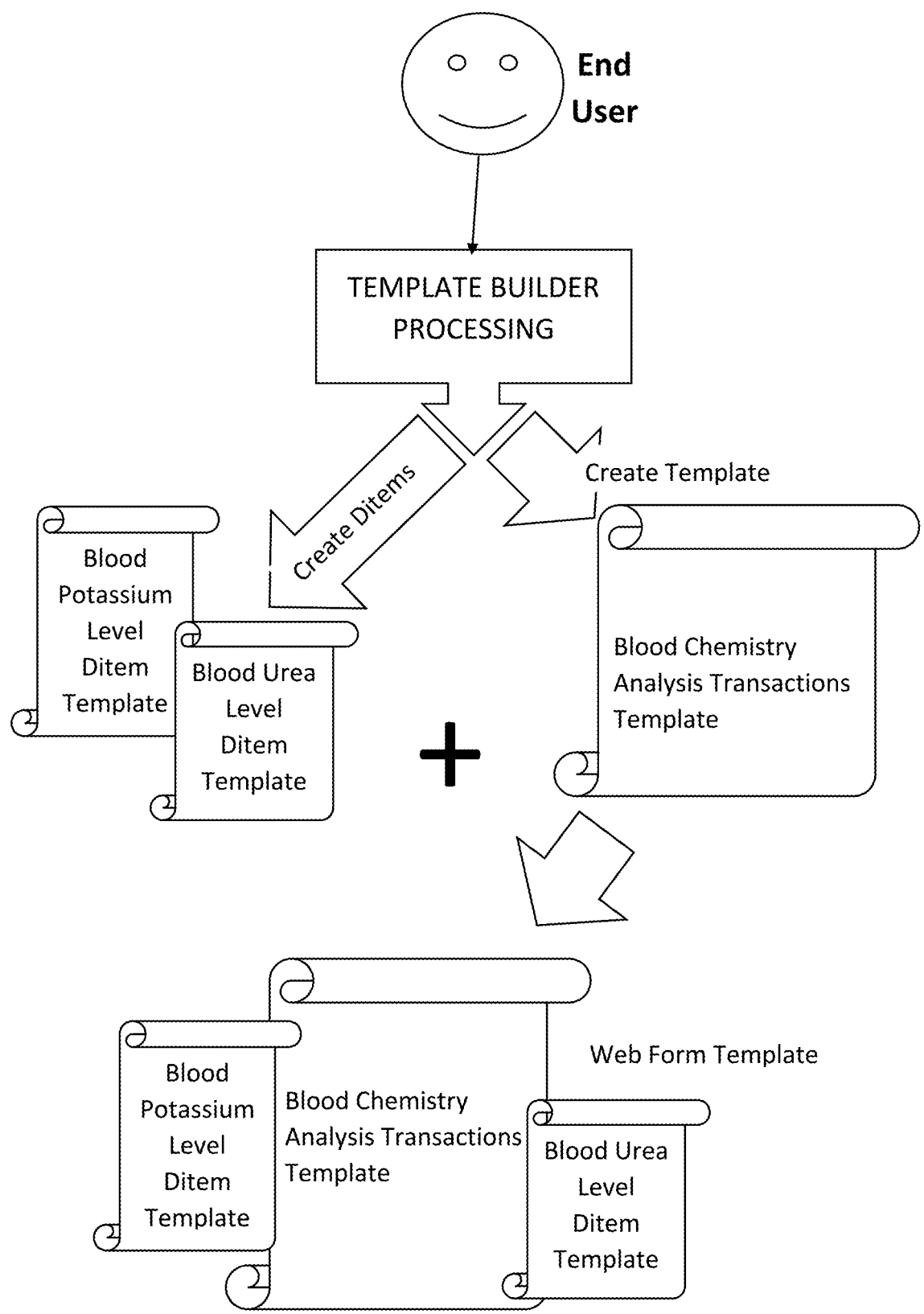
FIG. 9 is an illustration of the process of creating a template.
Figure 10:
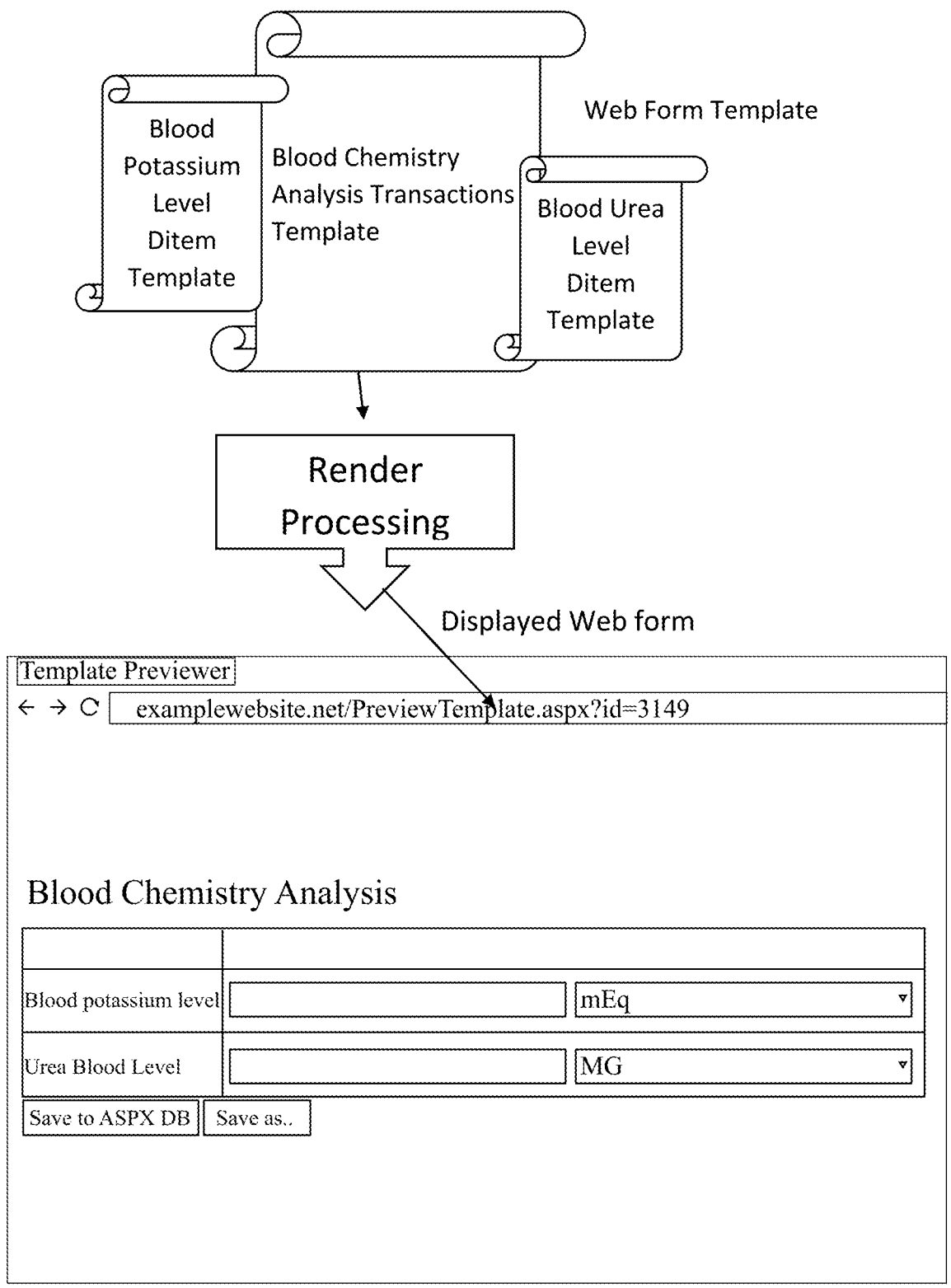
FIG. 10 is an illustration of the process of rendering the template as a web form.
Figure 11:
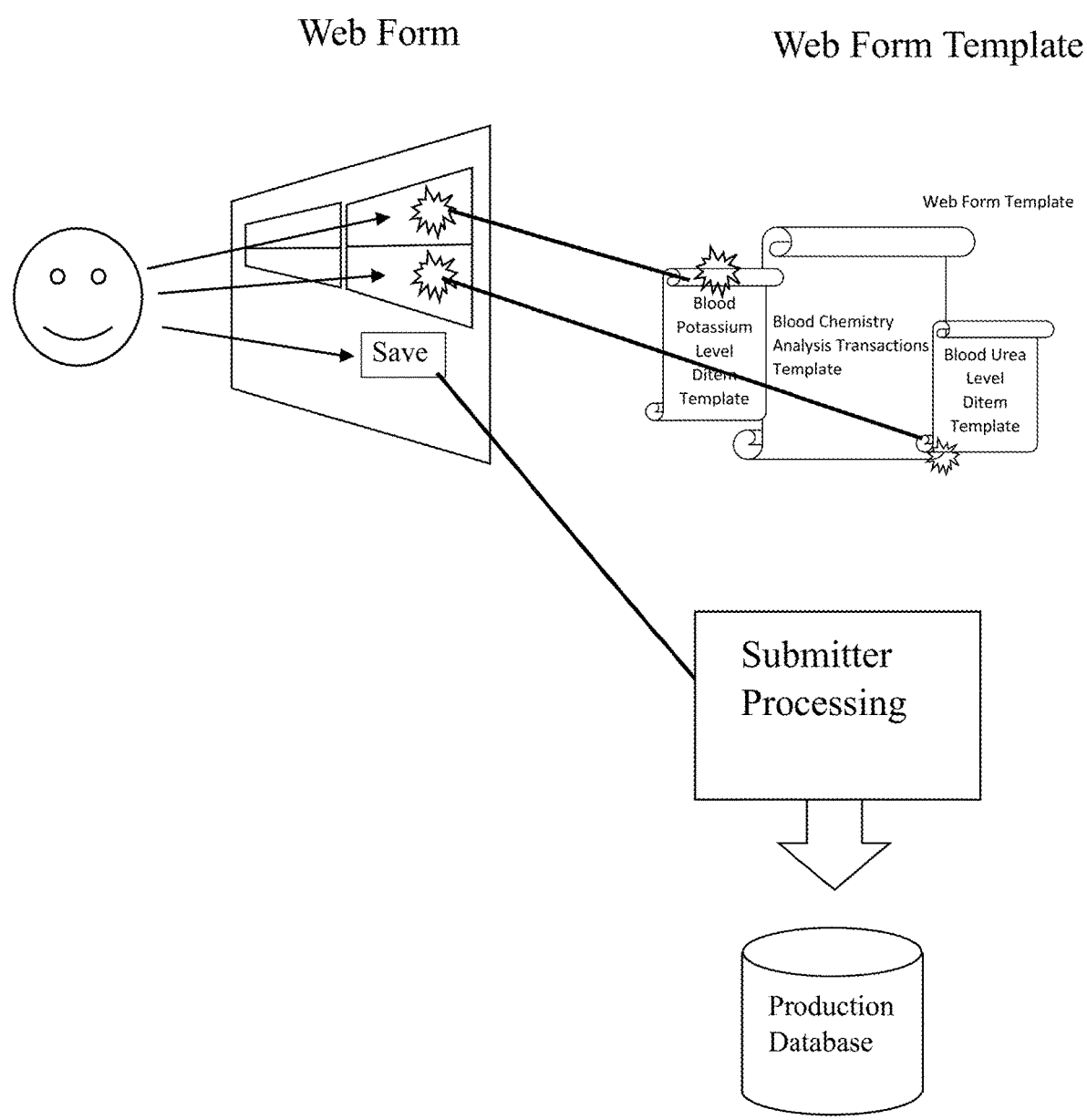
FIG. 11 is an illustration of the process of submitting a filled web form to the production database.

The present invention concentrates on capturing end user input for a certain data item value by a specific web control and at the same time capturing all meaningful values defining the context of the birth of that user input. The control is fully described in a computer-readable text in the data item template. End user input for a set of data items born under the same context is captured in a single web form. The template that describes this web form has several attributes, some of which are assigned definite values when the template is designed, and other attributes get their values when the web form is executed during runtime. The captured values are saved to the database. FIGS. 9-11 illustrate the general process of creating a template, rendering the template as a web form, filling it with user input, and submitting the filled form to the production database.

Figure 12:
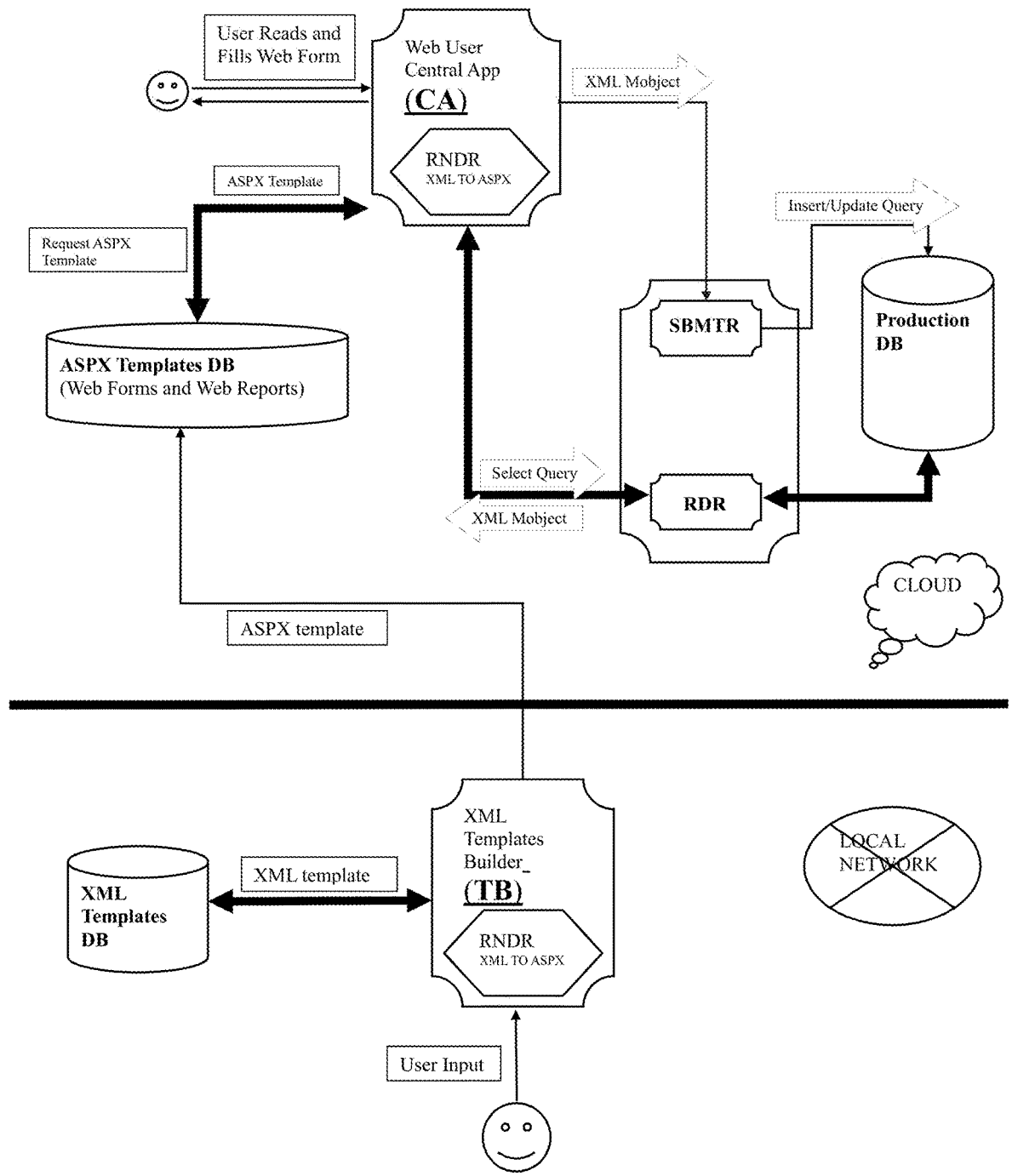
FIG. 12 is a data flow and dependency diagram of the present invention.

The preferred embodiment of the present invention generally depends on the production database, the template database, the environment database, and several software modules. The software modules function together to capture, store, and retrieve data in any business domain regardless of the nature of the business or its transactional rules. FIG. 12 shows a data flow and dependency diagram in the preferred embodiment of the present invention.

The first software module is a template builder module. The template builder module is a standalone application with a wizard GUI that leads an end user through a process to create computer-readable templates composed of XML and/or JSON markup. The end user of writes no code and builds the templates simply by following the wizard flow.

Templates built in the template builder can be of several types:
Data item templates, or ditem templates, serve to hold a single, strongly typed, data value with its validation rules.
Web form templates group several templates of ditem type. A web form template itself has a set of attributes whose values describe the state of occurrence of ditem values, which is meta data of ditems enriched with end user input and processing-generated runtime values.
Web report templates retrieve one or more formatted pieces of information from the production database, such as, but not limited to, filled ditems, ditem values, and ditem attributes.
Query templates retrieve the results of a query, a fully qualified SQL statement, that resides in the template.
Business process templates define a certain mix of web forms accessed either with or without an imperative sequence.

Figure 13:
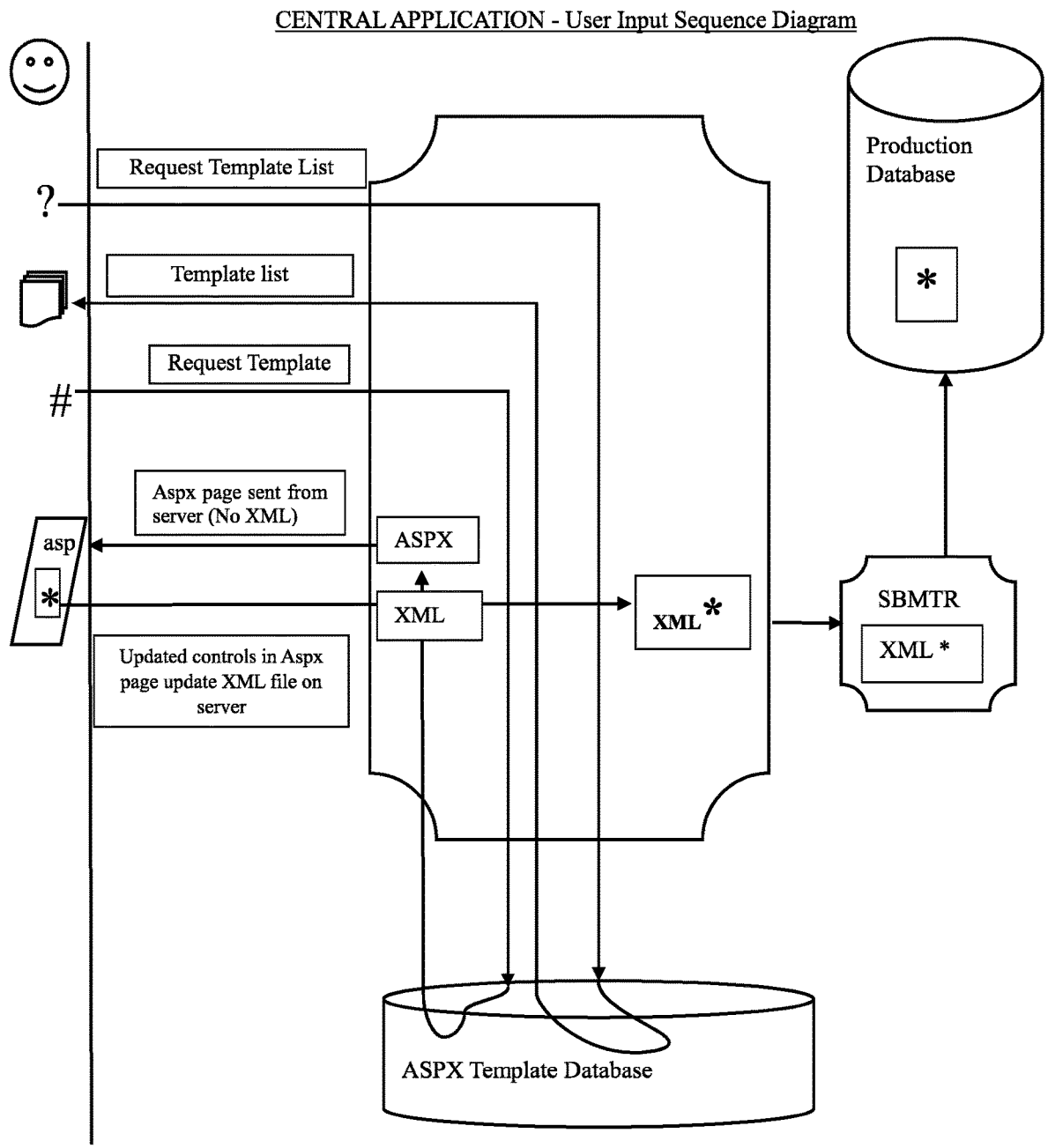
FIG. 13 is a user input sequence diagram.
Figure 14:
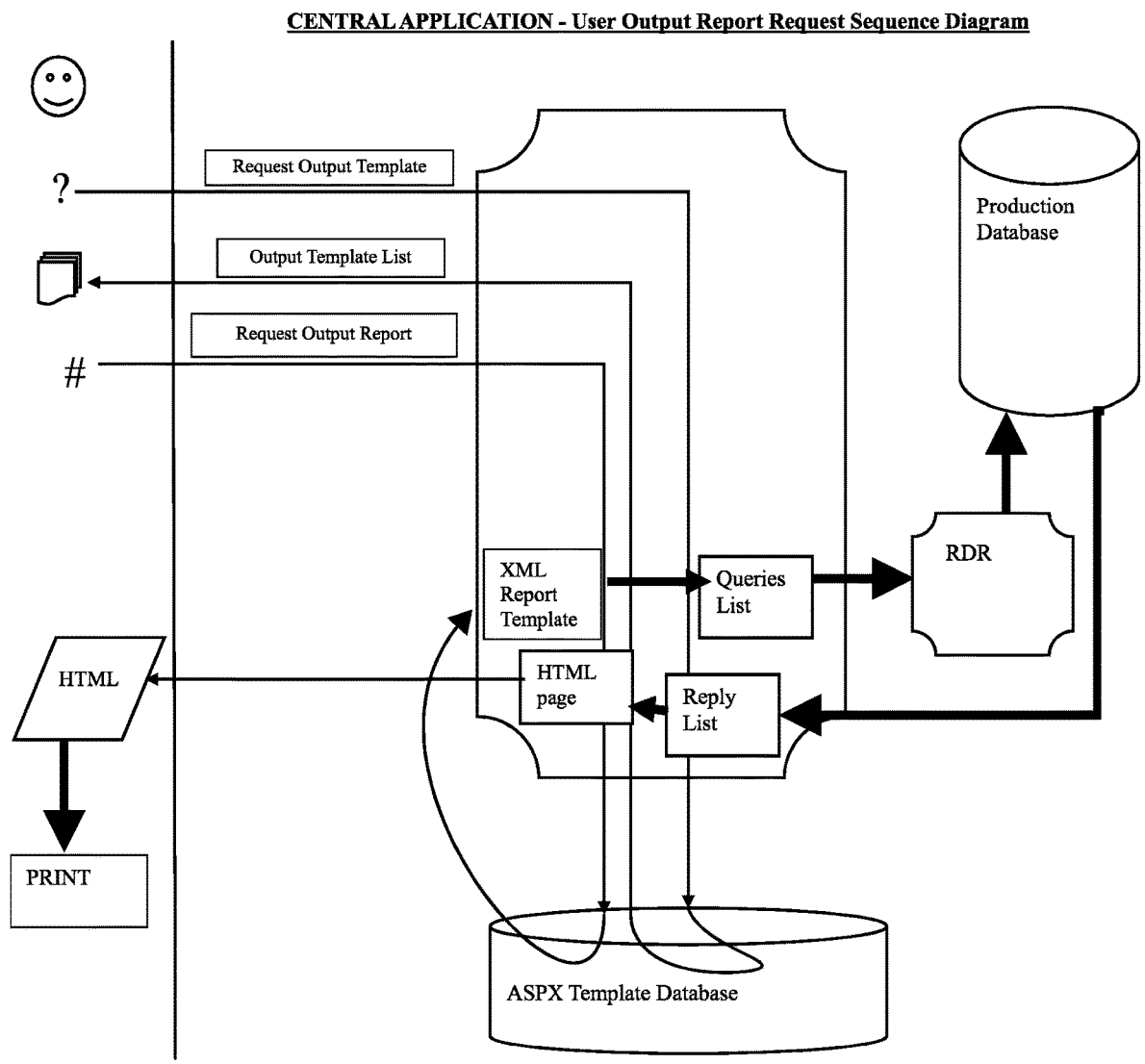
FIG. 14 is a user output sequence diagram.

The second software module is referred to as the central module. The central module acts to send and receive the computer readable templates between the other modules. The central module does not perform any processing on the templates; however, the central module creates runtime values that reference organizational entities performing business transactions, and pass those values to the other modules for updating templates' related attributes. The central module essentially functions to facilitate communication among the end user and the other software modules. A user input sequence diagram for interaction with the central module is shown in FIG. 13. A user output sequence diagram for interaction with the central module is shown in FIG. 14.

Another software module is referred to as a render module. The render module: receives computer-readable templates, processes them, and displays web forms rich with web controls; captures end user input in web controls of the web form, and validates the values according to the web control and web form template validation rules; and submits the templates after updating them with end user input to be saved, upon end user submittal action. An illustration of the functionality of the render module is shown in FIGS. 10-11. A render occurs either when a mobject is newly created from a specific mobject template, or when a mobject is retrieved for review from the production database.

Another software module is referred to as a submitter module. The submitter module receives the templates updated by end user input and saves the content of values in the production database.

Another software module is referred to as a reader module. The reader module receives and processes different types and numbers of query and report templates and executes them against the production database. The reader module retrieves data from the production database according to request, query or other process flow. Query and report results are returned as computer-readable files that can be processed by the render module or by the central module.

Another software module is referred to as an environment manager module. The environment manager module manages contextual data such as business environments, roles such as doctor or patient, "things" such as a person, device or organization, permissions for users and generally defines the contextual digital environment the present invention operates within. For example, the environment manager module can control access to various mobjects, mobject templates, ditems, ditem templates, transactions or other components of the present invention based on validating the credentials of the end user profile attempting to access them.

Figure 15A:
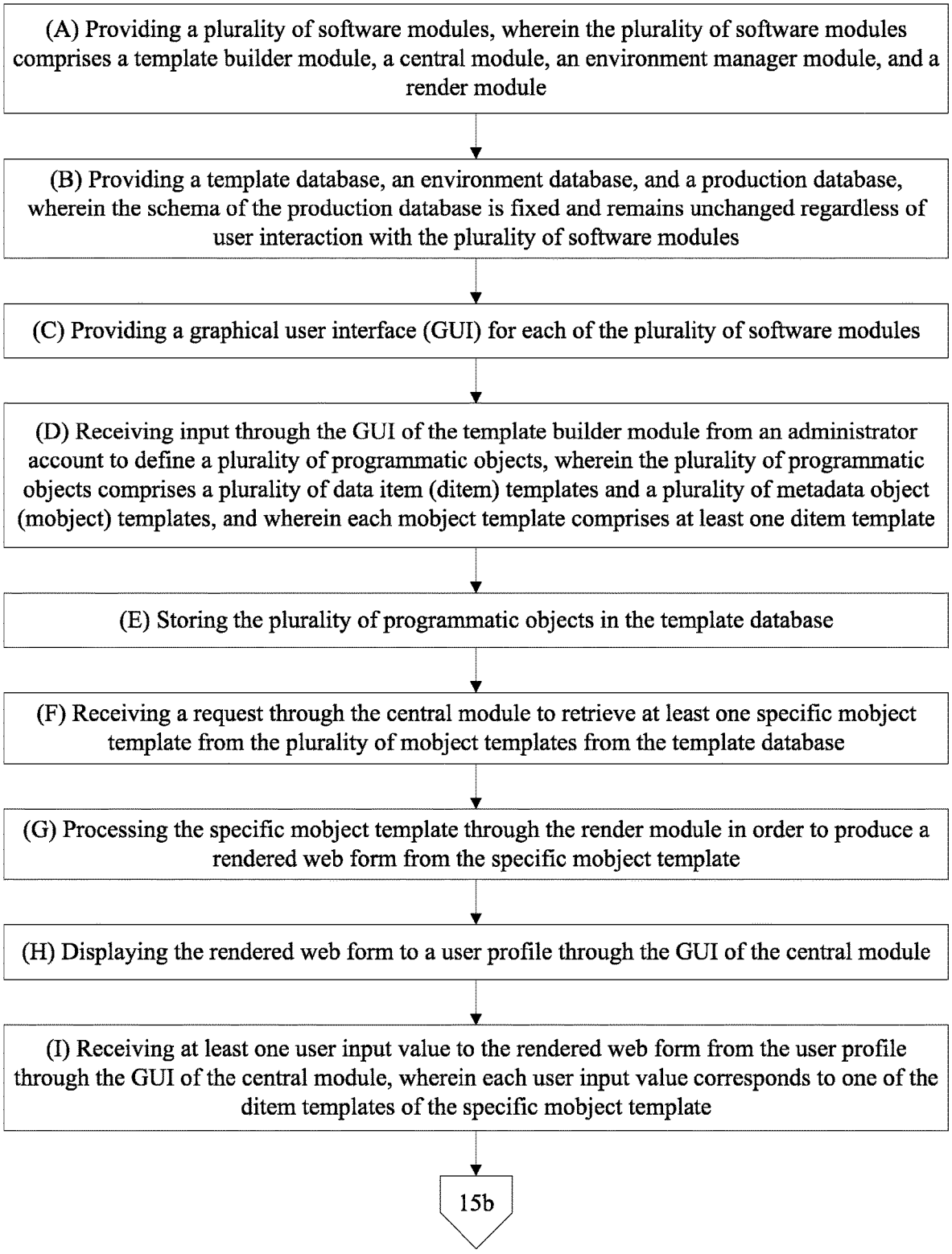
FIG. 15a is a stepwise flow diagram showing the steps of the general process of the present invention.
Figure 15B:
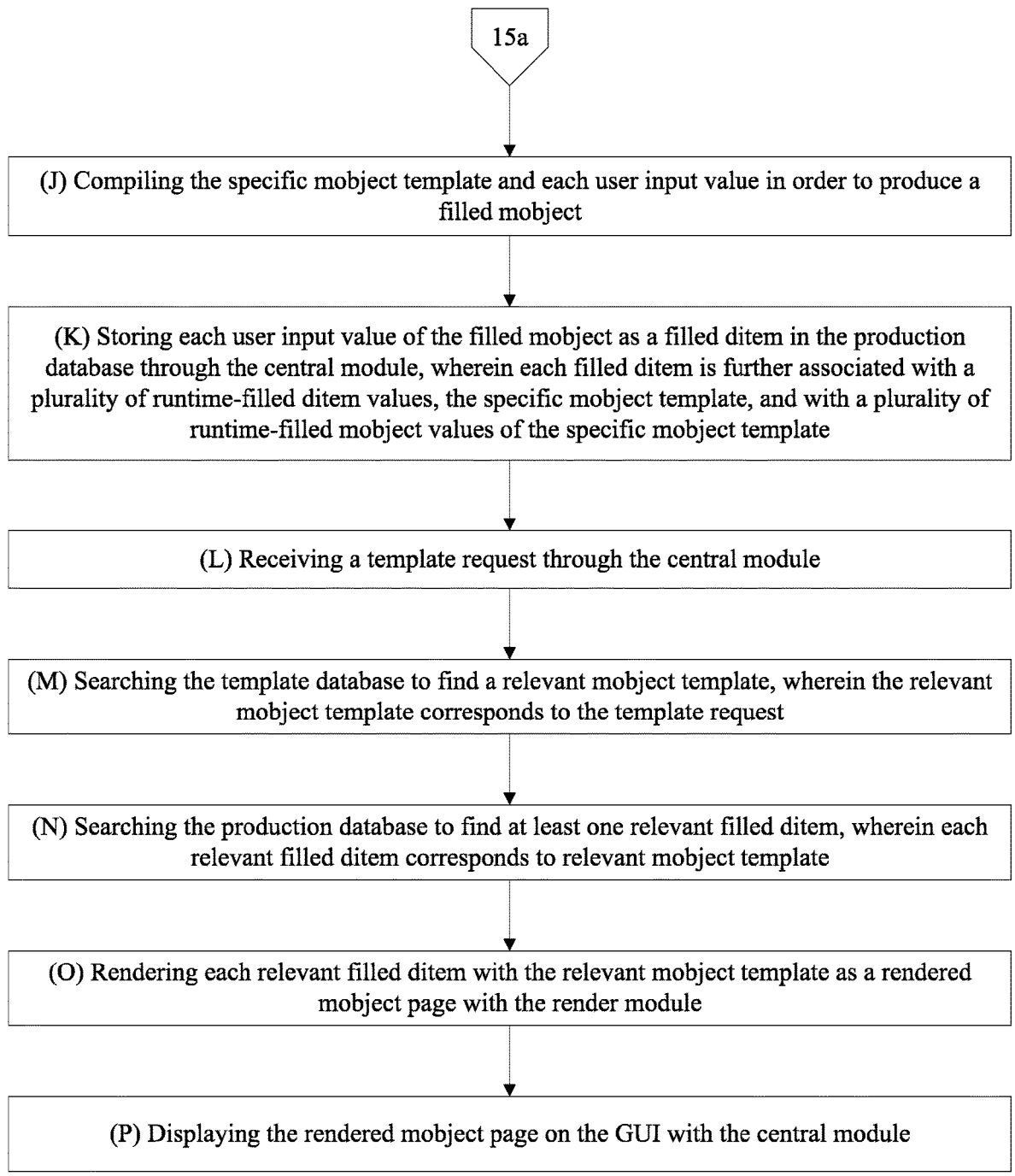

Referring to FIGS. 15a-15b, in the general process of the present invention, a plurality of software modules is provided (Step A). In the preferred embodiment of the present invention, the plurality of software modules comprises a template builder module, a central module, an environment manager module, and a render module. Furthermore, a template database is provided, as well as an environment database, and a production database (Step B). The schema of the production database is fixed and remains unchanged regardless of user interaction with the plurality of software modules. The central module facilitates communication among the environment manager module, the render module, the template database, the environment manager module, and the production database.

Figure 16:
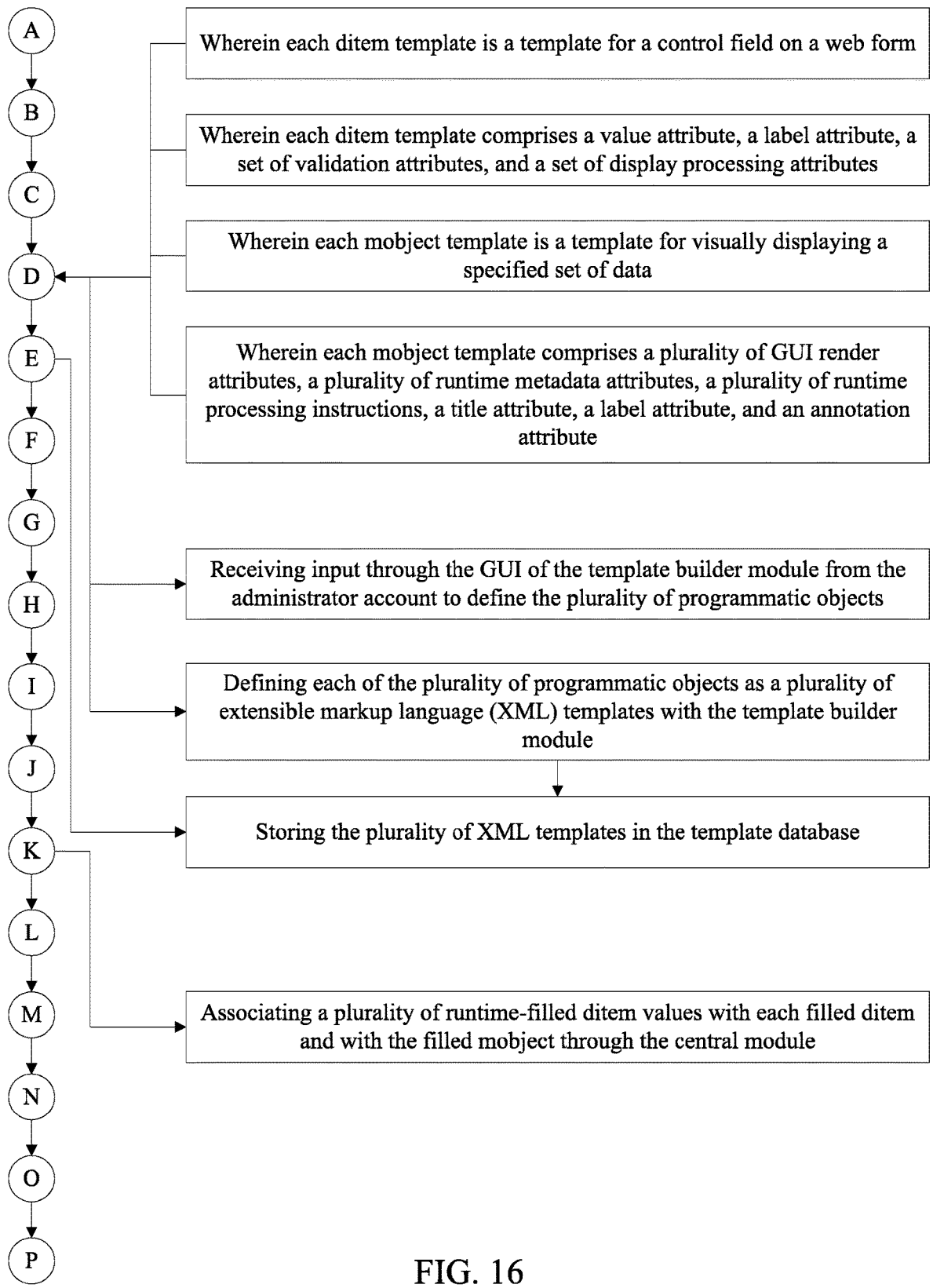
FIG. 16 is a stepwise flow diagram showing steps for defining mobject templates and ditem templates.

In the preferred embodiment, a graphical user interface (GUI) is furthermore provided for each of the plurality of software modules (Step C). Each GUI is a visual representation of controls and displays available to the user rendered on the digital display of a computing device in order to allow the user to interact with the present invention. The GUI for each software module may comprise various different fields, controls, and other options for interacting with the present invention based on the specific purpose and functionality of the different software modules. Alternatively, in one embodiment of the present invention, each software module may share the same GUI. Referring to FIG. 16, to start the general process of the present invention, input is received through the GUI of the template builder module from an administrator account to define a plurality of programmatic objects (Step D). The plurality of programmatic objects comprises a plurality of data item (ditem) templates and a plurality of metadata object (mobject) templates, wherein each mobject template comprises or is associated with at least one ditem template. Mobject templates represent web form templates, and ditem templates represent controls to be displayed on web forms. The mobject templates and ditem templates are preferably defined in XML language, and the programmatic objects are stored in the template database (Step E). Each mobject template is a template for visually displaying a specified set of data, and each mobject template comprises a plurality of GUI render attributes, a plurality of runtime metadata attributes, a plurality of runtime processing instructions, a title attribute, a label attribute, and an annotation attribute. Said mobject attributes are filled, processed or utilized during each transaction. Each ditem template is a template for a control field on a web form, and each ditem template comprises a "value" attribute, a set of validation attributes, a label attribute, and a set of display processing attributes. Said ditem attributes are filled, processed or utilized during a transaction.

When an end user wishes to utilize a pre-defined template to process a transaction in the business environment, the user submits a template request through the GUI of the central module. It should be understood that the template request is not necessarily made explicitly, and may be triggered when the user selects a type of transaction to initiate, for example. The request is received through the central module to retrieve at least one specific mobject template from the plurality of mobject templates stored in the template database (Step F). The specific mobject template is processed through the reader module in order to produce a rendered web form from the specific mobject template (Step G), and the rendered web form is displayed to a user profile through the GUI of the central module (Step H), wherein the user profile is associated with the end user that initiated the transaction.

The rendered web form comprises at least one input field or other web form control, such as, but not limited to, a text input box, a radio control, a drop down menu, a password field, or any other type of web form control. Each web form control corresponds to one of the ditems associated with the specific mobject template. When the specific mobject template is retrieved from the template database, so too is each ditem template corresponding with the specific mobject template so that the ditem templates can be rendered as web controls on the rendered web form of the specific mobject template.

The user then interacts with the rendered web form according to the transactional purpose of the specific mobject template. For example, if the specific mobject template relates to a blood withdrawal transaction, the user will enter the amount of blood drawn as a number in one of the web controls corresponding to one of the ditems of the specific mobject template. Thus, at least one user input value is received to the rendered web form from the user profile through the GUI of the central module (Step I), wherein each user input value corresponds to one of the ditem templates of the specific mobject template. The specific mobject template and each user input value are compiled in order to produce a filled mobject (Step J). The filled mobject can be generally understood to be an association between the user input values entered into the web form controls of the rendered webpage, the specific mobject template, the ditem templates of the mobject template, and various metadata about the transaction with the specific mobject template. The metadata includes attributes such as, but not limited to, time of transaction, user profile participating in the transaction, and other relevant metadata about the transaction.

Filled ditems should be understood similarly. Each user input value of the filled mobject is stored as a "value" attribute of a filled ditem in the production database through the central module (Step K), and each filled ditem is further associated with the specific mobject template, the filled mobject, a plurality of runtime-filled ditem values, and a plurality of runtime-filled mobject values of the specific mobject template. The runtime-filled ditem values are the set of metadata as described above as pertaining to the received user input values and the corresponding ditem templates of the specific mobject template. The plurality of runtime-filled mobject values are the set of metadata as described above as pertaining to the specific mobject template itself as the transaction utilizing the specific mobject template is completed.

Another type of transaction a user may perform with the system of the present invention is a report or query type transaction. A report or query retrieves the filled ditems and filled mobjects produced by the above process for display to the user. For example, a user may wish to retrieve a filled mobject of the example transaction for blood withdrawal in order to review said transaction after the transaction has been completed. A query is a search for specific ranges or types of data; for example, a user may query the system for all blood withdrawal transactions within the last two weeks for a specific patient or doctor.

Thus, a template request, either a query template request or a report template request, is received through the central module (Step L). The template database is searched to find a relevant mobject template (Step M), wherein the relevant mobject template corresponds to the template request. The production database is searched to find at least one relevant filled ditem (Step N), wherein each relevant filled ditem corresponds to the relevant mobject template. Each relevant filled ditem is rendered with the relevant mobject template as a rendered mobject page with the render module (Step O), and subsequently the rendered mobject page is displayed on the GUI with the central module (Step P).

Figure 17:
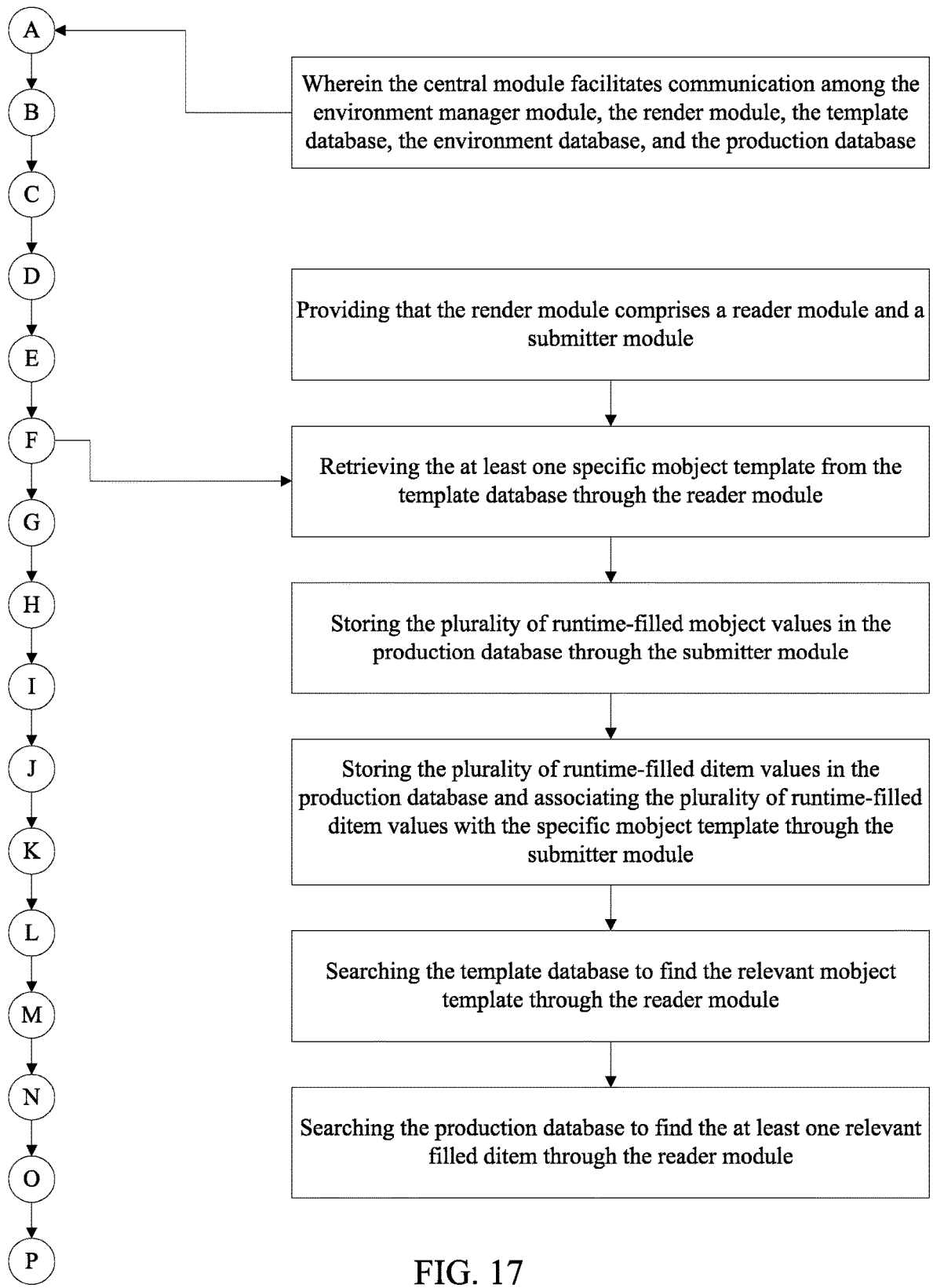
FIG. 17 is a stepwise flow diagram showing steps for retrieving and storing templates and filled templates.

Referring to FIG. 17, in one embodiment of the present invention, the render module comprises a reader module and a submitter module. In another embodiment, the reader module and the submitter module are provided separately from the render module, and utilized in conjunction with the render module. Regardless, the render module uses the reader module and the submitter module to communicate with the template database and the production database. The at least one specific mobject is retrieved from the template database through the reader module. The plurality of runtime-filled mobject values are stored in the production database through the submitter module. The plurality of runtime-filled ditem values are stored in the production database and associated with the specific mobject template through the submitter module. When processing a report or query to retrieve filled mobjects and ditems from the production database, the template database is searched to find the relevant mobject template through the reader module, and the production database is searched to find the at least one relevant filled ditem and its related mobject through the reader module.

In the preferred embodiment of the present invention, the environment manager module is an ancillary software module provided to regulate the environment of transactions in the system. The environment manager regulates entities, such as people, organizations or things that interact with and within the system of the present invention. One function of the environment manager is to validate permissions for users of the present invention. In the preferred embodiment, each user profile registered to interact with the present invention is associated with a set of user permissions in the environment database, and ditems and mobjects further comprise a set of transaction rules. The transaction rules dictate which users can and cannot access ditems or mobjects. For example, one mobject may be set to allow access only to user profiles of doctors. Therefore, a user profile of a nurse would not be allowed to access said mobject.

Figure 18:
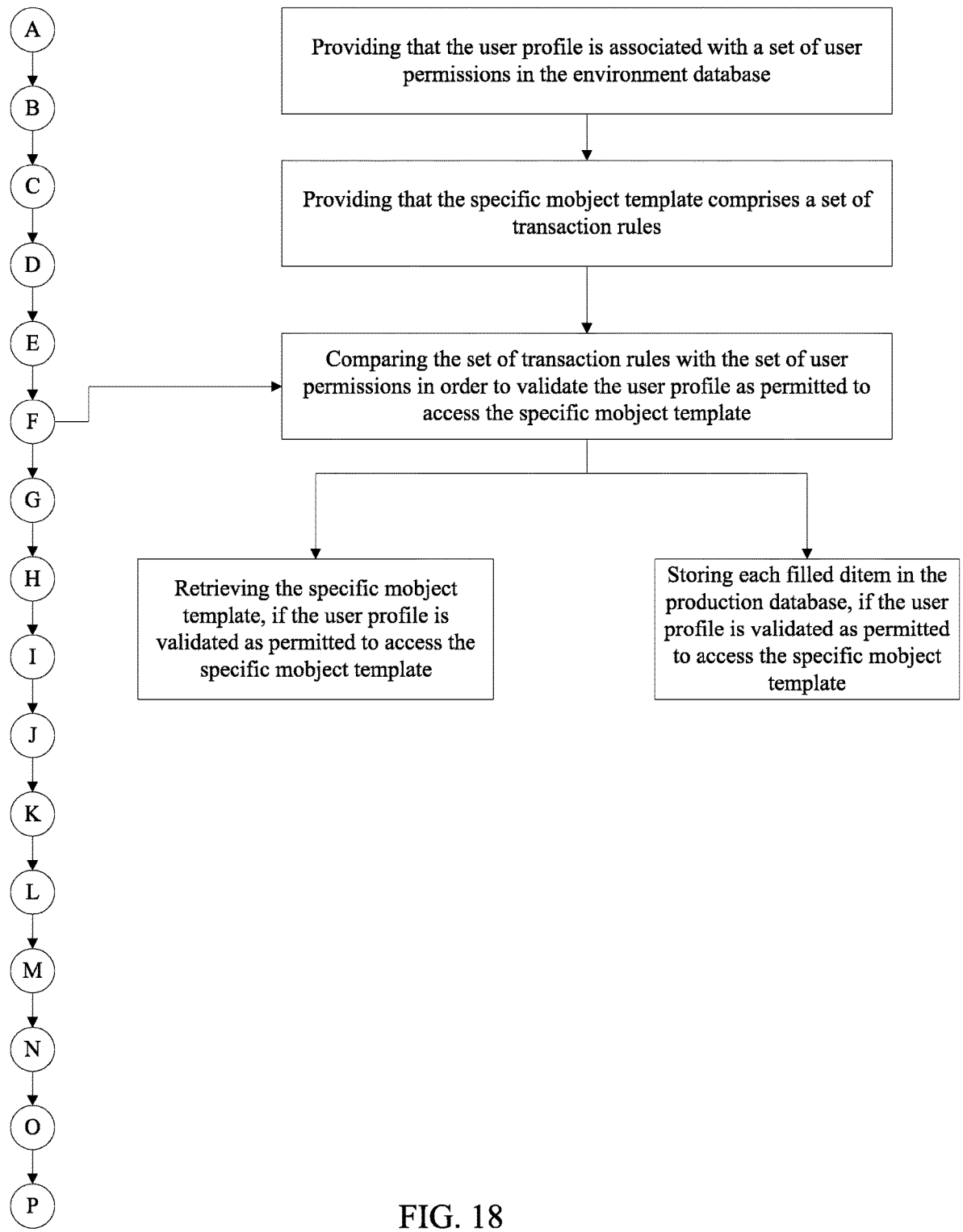
FIG. 18 is a stepwise flow diagram showing steps for validating user permissions.

Thus, as described in FIG. 18, providing that the user profile is associated with a set of user permissions in the environment database, and providing that the specific mobject template comprises a set of transaction rules, the set of transaction rules is compared with the set of user permissions in order to validate the user profile as permitted to access the specific mobject template. If the user profile is validated with the environment manager module as permitted to access the specific mobject template, the specific mobject template is retrieved. Each filled ditem is only stored in the production database upon submittal if the user profile is validated as permitted to edit and save the specific mobject template.

Figure 19:
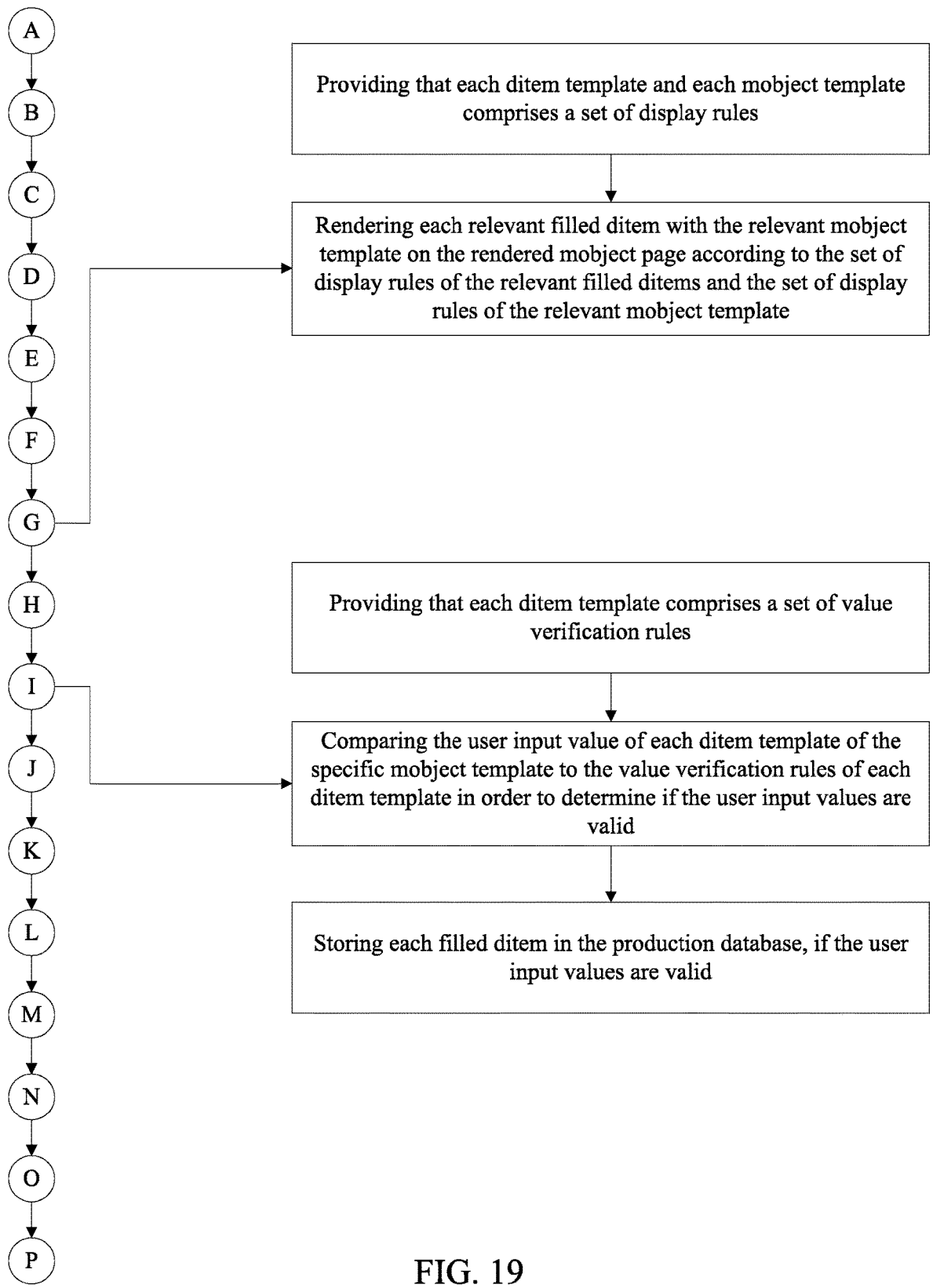
FIG. 19 is a stepwise flow diagram showing steps for managing template rules.

As described in FIG. 19, related to credential verification is rule verification as pertaining to user input values into a ditem. Providing that each ditem template comprises a set of value verification rules, the user input value of each ditem template of the specific mobject template is compared to the value verification rules of each ditem template in order to determine if the user input values are valid, and each filled ditem is stored in the production database is the user input values are determined to be valid. For example, a ditem template may require that its input be numerical only. If the user input value includes a character other than a number, the user input value is determined to be invalid. A further case of applying rules is display rules or instructions for mobjects and ditems. This pertains to how mobjects and ditems are presented on the GUI in their arrangement and appearance. In the preferred embodiment of the present invention, each ditem template and each mobject template comprises a set of display rules. Thus, each mobject template is rendered as a web form according to the set of display rules of the mobject template, and each ditem template is rendered on the web form according to the set of display rules of the ditem template. For example, one of the display rules may concern visibility of the ditem on a web form depending on a "View Privilege Level" of the current user. In a report web form, each relevant filled ditem is rendered with the relevant mobject template on the rendered mobject page according to the set of display rules of the relevant filled ditems and the set of display rules of the relevant mobject template.

Figure 20:
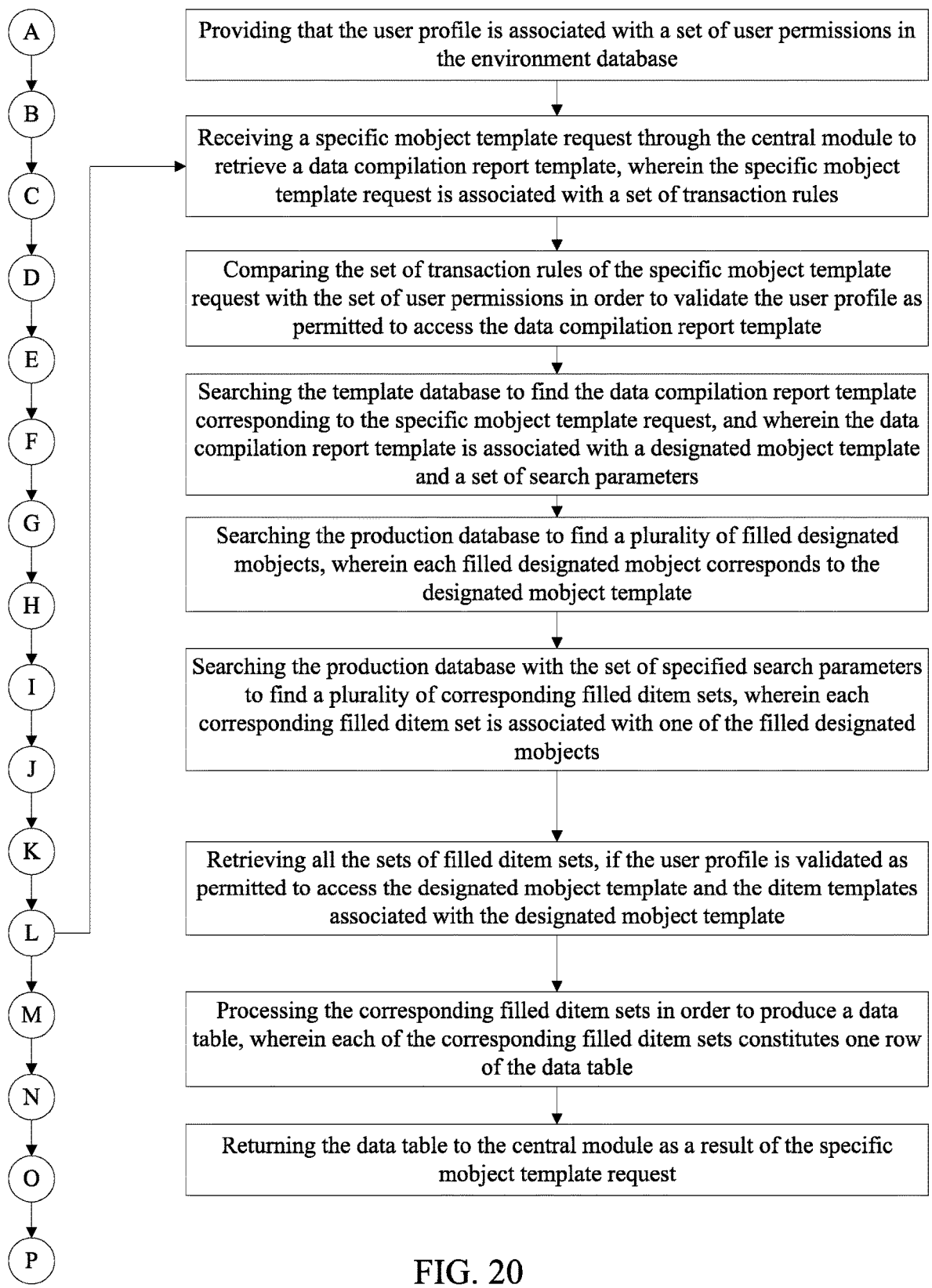
FIG. 20 is a stepwise flow diagram showing steps for generating a report.

As shown in FIG. 20, another function in the preferred embodiment of the present invention is to generate a report. A report compiles data for a specified request and displays it to the user. For example, a user may request a report for a user submits a request to generate a report. A specific mobject template request is received through the central module to retrieve a data compilation report template, wherein the specific mobject template request is associated with a set of transaction rules. The set of transaction rules of the specific mobject request is compared with the set of user permissions in order to validate the user profile as permitted to access the data compilation report template. If the user profile is validated as permitted to access the data compilation report template, the template database is searched to find the data compilation report template corresponding to the specific mobject template request, wherein the data compilation report template is associated with a designated mobject template and a set of search parameters. The production database is searched to find a plurality of filled designated mobjects, wherein each filled designated mobject corresponds to the designated mobject template. The production database is searched with the set of specified search parameters to find a plurality of corresponding filled ditem sets, wherein each corresponding ditem set is associated with one of the filled designated mobjects. The corresponding filled ditem sets are retrieved, if the user profile is validated as permitted to access the designated mobject template and the ditem templates associated with the designated mobject template. The corresponding filled ditem sets are processed in order to produce a data table, wherein each of the corresponding filled ditem sets constitutes one row of the data table. The data table is then returned to the central module for display to the user profile as a result of the specific mobject template request.

The following is an alternate explanation of the present invention. The following disclose should not be considered to be limiting, but rather as an exemplary embodiment to further illustrate the spirit of the present invention. Some details may be redundant, but are included for the sake of clarity.

The further functional structure of ditems in the preferred embodiment of the present invention is as follows. Ditem templates inherit a basic set of attributes from an abstract base class; thus, all ditem types have common attributes, while certain attributes are not inherited and are specific to certain child classes according to the data type of the class; for example, a value qualifier attribute exists only for numeric data type ditems.

All ditem templates have a 'Value' attribute that is updated by the end user or runtime processing input. The 'Value' attribute can also be set at template design time to be used as a seed-value in the web form later when the control is executed on a web form.

All Ditem templates have a 'Label' attribute that represents the contextual name of the 'Value' in the business domain. In the Blood Sample Example above, the string 'Volume of the withdrawn blood' is the 'Label' of the 'Value' 5.

The ditem has a set of attributes that are descriptive and restrictive of the value of the item. For example, 'Volume of Blood' is measured by milliliters or liters depending on the context but it cannot be Boolean datatype, measured in kilometers, or be larger than a certain integer value.

Ditems may further have an 'Annotation' attribute that let the end user tag the Value with a string that further describes it. Example: A Potassium level of 8 in the blood chemistry profile can hold an annotation stating the blood sample was hemolyzed when received by lab. In this way, even purely numeric values can gain string descriptions that render them very reflective of the state of occurrence of the Value of Ditem.

Upon displaying a ditem as a web control in a web form, the value entered by the end user in the control is assigned to the 'Value' attribute of the ditem after validating it according to the set of validating attributes in the ditem template.

In certain web controls, template processing assigns the 'Value' of the ditem not from end user input, but from special processing instructed by the template containing the ditem. In that way, the ditems are aware of their own source of data and can display therefore to the end user a template-defined list of values either as a drop list, or, if the data source is a query SQL statement, guide the end user to select a value from a template-defined resource available over the network/internet exposes to the template a pre-designated web service.

Depending on the value of their "View Privilege Level" attribute, certain web controls are not visible to a certain end user on the web form although they exist; this happens when this user's "View Privilege Level" value is lower than that required to view the web control. Certain web controls are similarly visible to the end user on the web form but are disabled to become inaccessible for runtime editing depending on a failed "Edit Privilege Level" value. If the end user right-clicks any ditem web control on any web form displayed by the render module, an annotation form opens up permitting the end user to enter an annotation string. This string becomes assigned to the 'Annotation' attribute of the ditem in the template.

The functional structure of web form templates in the preferred embodiment of the present invention is as follows. Web form templates have two parts: a set of attached ditem templates, and a set of attributes pertaining to the web form itself.

The web form attribute set constitutes the definition of state of occurrence of the values of the ditem set.

Any attribute could serve more than one objective, some are destined to control GUI features or menus, while others indicate runtime-generated events such as end user name, date-time, or the organization entity to which the template refers. The metadata attribute set serves finally as filtration parameters when the mobject table is queried in the production database.

Each web form template specifies whether the form can be filled and saved in a single session or in several sessions; that is, if the form can be saved and then re-edited; or, if it has to be saved once without future editing. The web forms that are so-defined are protected with a specific end user pin that locks the web form according to template instructions when end user is saving the web forms. For example: workgroup, menu, and end user privileges.

Access to web forms templates and mobjects is regulated through the environment manager module by certain business rules that relate attribute values of mobject to environment variables.

Web form templates can be displayed as web forms of several GUI types:
Classical stack-type of textboxes of classical forms
Invoice-Type where additional rows can be added
Comparison-Type where additional columns can be added
Multiple Horizontal Arrays of a Ditem,
Multiple Vertical Ditem Array
Composite type that is displayed on multiple tabs each of which displaying one of the previous templates. In Composite type, web reports and queries can be incorporated as components on the tabs.

The functional structure of web reports templates in the preferred embodiment of the present invention is as follows. Report templates are composed of two parts: The first is a set of metadata attributes exactly similar to web form templates. The second is a set of web Report Sections. Each web Report Section is composed of a mix of a set of Ditems and a set of Mobjects. Each set is designated by a 'Date Delimiter' attribute that defines the time span of search. The Ditem section contains several Ditems each specified by the special unique identifier of its Ditem Template. The Mobject section contains several Mobjects, each specified by the special unique identifier of its Mobject Template. The Mobject section sets the display mode the retrieved Mobjects set either as sequential individual ones, or compiles them to be displayed as a table. The column heads in this table are formed by the constituent Ditem Labels. The cells are filled with the constituent Ditem Values.

The elements of the web report are used to query the Production Database by the Reader module using the parameters defined in the report template. Returned Information is formatted to become End User-friendly when displayed by the Central or Render module. Access to web reports, is regulated in the Central module by certain attribute values of Mobject.

The functional structure of web Query Templates in the preferred embodiment of the present invention is as follows. Query templates are composed of two parts: The first part is a set of metadata attributes exactly similar to web form templates. The second part is the Query Definition part. In contrast to web Report Templates, the target of these query templates is not limited to the Production Database. The Query Definition part contains the URL address of the resource which is queried, and the parameters required to access the resource such as the password, username, and so forth, and finally the SQL statement representing the query.

Elements of a web query are used to query the Production Database by the Reader module using the parameters defined in the query template. Returned Information is formatted to become user-friendly when displayed by the Central or Render module. Access to web queries is regulated in the Central module by certain attribute values of Mobjects.

The functional structure of Process templates in the preferred embodiment of the present invention is as follows. Process templates are composed of two parts: The first is a set of metadata attributes exactly similar to web form templates. The second is the Process Definition part. The Process Definition part contains the Process Elements. The Process is composed of several templates of different types, such as web forms, web reports, and queries. The template specifies whether the elements are executed in a certain imperative sequence or randomly. Access to a Process Template is regulated in Central module by certain attribute values of the Process Template; furthermore, access to individual component templates of the Process is further controlled by specific access to that template.

The render module can also save certain data that is captured during runtime in other databases in addition to the Production Database. This functionality is executed when the template includes instruction to perform a 'Parallel Insertion'. Parallel Insertion is a Render function that serves to update certain particular tables that are not part of Production Database. These tables serve a vertical functionality required in the business domain such as maintaining financial transactions that happen in the Environment. In this way, a web form that documents consumption of certain items from the stores of an organization can at the same time, by using Parallel Insertion, charge the account of the entity receiving the consumed items without creating and updating a special form for that purpose. Tables updated by Parallel Insertion are—as is the case of any other data resource—open to expose their content to query templates.

Render displays in End User-friendly format web pages or forms that are returned results from Reader.

The functional role of the central module in the preferred embodiment of the present invention is as follows:

The Central module interacts with Environment specific services to perform the functions of End User validation, Environment entity credentialing and privileging, and access to Environment Knowledge Base.

The Central module displays Menus in a sequence of that is affected by the attributes of Templates called by the End User during his interactions with the current invention modules. The display mode of a Menu is further affected by End User privileges regarding the member Menu Items of a Menu.

Functional integration between modules and external systems in the present invention is as follows. All messaging between the different modules of the current invention is executed through computer-readable files of XML or JSON markup languages. The engine of the present invention can integrate other software output if it is a computer-readable file that could be parsed by special plug in functions.

The engine can be integrated to send messages to other systems if recipient system is able to parse computer-readable files composed by special plug in functions.

In summary: the present invention is a software engine, that uses several software modules, to permit End Users, of any business domain, to design, create, and use unlimited number of different types of web forms and save their content in a fixed-structure database.

One software module of the present invention is a Template Builder application that permits user to create computer-readable files thereafter called templates.

Templates are composed of XML/JSON text that, when processed, execute a definite computer function.

Templates can generate web controls, web forms, web reports, web queries, and web business processes; they include business rules defined by the user and enforced when the template is processed.

Templates set and control GUI appearance, menus and behavior, and render the GUI context-sensitive.

Templates set and persist information of sequence and relation between web forms whose contents have been saved in the Production Database; this permits retrieval of data input context.

Templates set and control the parameters and business rules of data-retrieval and data-filtration in the Production Database.

Templates can set seed values in web controls and web forms, saving the web form user from entering repeatedly used data.

The Structure of the Production Database does not change regardless of the number, type, and definition of feeding forms, business domain, or business rules; this fixed structure is nevertheless responsive to an unlimited number of different types of user-defined reports and queries.

Another software module of the present invention is a Render Module capable of processing Templates to display web forms and web reports. The Render captures user input in the displayed web forms. Render sends End User and runtime updated web form templates to be saved in Production Database by the Submitter module.

Another software module of the present invention is a Submitter Module that persists user input captured in web forms in the Production Database.

Another software module of the present invention is a Reader Module that retrieves information from Production Database in different user-defined formats.

The software engine of the present invention, in contrast to Object Oriented Programming OOP principles, is conceptually, methodically, and programmatically centered on data value and the metadata related to that value. The Objects, as known in OOP, do not exist in this software engine; the templates, are entirely built by the user without programming, and do not require any additional code writing in order to fulfill a complete functional lifecycle from template form design, to data capture, persistence, and retrieval.

To the knowledge of the Applicant, there is no described prior art that, within the frame of one single engine, achieves all of the above claims in a full functional lifecycle applicable in any business domain.

Although the invention has been explained in relation to its preferred embodiment, it is to be understood that many other possible modifications and variations can be made without departing from the spirit and scope of the invention as hereinafter claimed.

What is claimed is:

1. A method of data capture, storage and retrieval through merging in a three-table relational database of a plurality of disparate user-created and filled XML form templates and XML data item templates by executing computer-executable instructions stored on a non-transitory computer-readable medium comprising the steps of:
   (A) providing a plurality of software modules, wherein the plurality of software modules comprises a template builder module, a central module, an environment manager module, and a render module, the render module comprising a reader module and a submitter module;
   (B) providing a template database, an environment database and a production database, the production database being composed of a Ditem table, a Mobject table and a Mobject-Relation table;
   (C) wherein each row in the Ditem table, when processed by the plurality of software modules, generates a well-formed XML file whose XML-tags correspond to column-head names in the Ditem table, and whose XML-values represent web form control descriptive and qualitative attributes, wherein each row in the Ditem table holds, in addition to its own primary key value field, a foreign key value field that points to the primary key of a specified row in the Mobject table, wherein every Ditem XML file contains certain mandatory fields with the XML-tags of 'Label' and 'Value,' wherein the 'Label' represents a name/title of the Ditem;

(D) wherein each row in the Mobject table, when processed by the plurality of software modules, generates a well-formed SGML/XML file whose SGML/XML-tags correspond to column-head names in the Mobject table, and whose SGML/XML-values represent a web form metadata descriptive and qualitative attribute values, wherein each row in the Mobject table holds a primary key value field that is referenced by the foreign key value field in one or more rows in the Ditem table;

(E) wherein the collective well-formed XML file that results from combining a file generated from the Mobject table and one or more rows of the Ditem table, when processed by the plurality of software modules, produces a webform that is displayed to an end user to capture a input of the end user, wherein the webform is enabled to save user input data in the XML file and ultimately in the 'Value' field of the Ditem table;

(F) wherein each row in the Mobject-Relation table holds in addition to its own primary key, two foreign key value fields that correspond to the primary key values of two specified mobjects, and a relation type value field;

(G) providing a graphical user interface (GUI) for each of the plurality of software modules that receives user input, or displays user data;

(H) receiving input through the GUI of the template builder module from an administrator account to define a plurality of programmatic objects, wherein the plurality of programmatic objects comprises a plurality of data item (ditem) templates and a plurality of metadata object (mobject) templates, and wherein each mobject template comprises at least one ditem template;

(I) storing the plurality of programmatic objects in the template database;

(J) receiving a request through the central module to retrieve at least one specific mobject template from the plurality of mobject templates from the template database;

(K) processing the specific mobject template through the render module in order to produce a rendered web form from the specific mobject template, wherein each ditem template of the retrieved mobject template is rendered as a web control on the web form;

(L) displaying the rendered web form to a user profile through the GUI of the central module;

(M) receiving at least one user input value to the rendered web form from the user profile through the GUI of the central module, wherein each user input value corresponds to one of the ditem templates of the specific mobject template;

(N) compiling the specific mobject template and each user input value in order to produce a first value-specified filled mobject;

(O) storing each user input value of the filled mobject in the 'Value' field of the Ditem table in the production database through the central module and the submitter module, wherein each filled ditem is further associated with a plurality of runtime-filled ditem values, the specific mobject template, and with a plurality of runtime-filled mobject values of the specific mobject template that contains the filled ditem;

(P) repeating steps (J)-(O) to produce a second value-specified filled mobject;

(Q) associating the first value-specified filled mobject with the second value-specified filled mobject by a common identifier in the Mobject-Relation table when depending on certain runtime system-determined values;

(R) receiving user request searching the production database to find at least one relevant filled ditem, wherein each relevant filled ditem corresponds to relevant mobject template;

(S) rendering each relevant filled ditem with the relevant mobject template as a rendered mobject page with the render module;

(T) displaying the rendered mobject page on the GUI with the central module;

(U) receiving user request for searching the production database to find at least one relevant filled type of mobject template, wherein each relevant filled mobject corresponds to relevant mobject template type;

(V) compiling an array of set of ditems of similar mobjects retrieved in step (U) to generate a single runtime data table in which the array of set of ditems of each retrieved mobject constitute a single row; and (W) displaying to the end user a table of the compiled sets of ditems representing the array of the specified mobject template-type.

2. The method as claimed in claim 1, wherein the central module facilitates communication among the environment manager module, the render module, the template database, the environment database, and the production database.

3. The method as claimed in claim 1 comprising the steps of:

providing that the user profile is associated with a set of user permissions in the environment database;

providing that the specific mobject template comprises a set of transaction rules;

comparing the set of transaction rules with the set of user permissions in order to validate the user profile as permitted to access the specific mobject template; and retrieving the specific mobject template, if the user profile is validated as permitted to access the specific mobject template.

4. The method as claimed in claim 1 comprising the steps of:

providing that the user profile is associated with a set of user permissions in the environment database;

providing that the specific mobject template comprises a set of transaction rules;

comparing the set of transaction rules with the set of user permissions in order to validate the user profile as permitted to access the specific mobject template; and storing each filled ditem in the production database, if the user profile is validated as permitted to access the specific mobject template.

5. The method as claimed in claim 1 comprising the steps of:

providing that the user profile is associated with a set of user permissions in the environment database;

receiving a specific mobject template request through the central module to retrieve a data compilation report template, wherein the specific mobject template request is associated with a set of transaction rules;

comparing the set of transaction rules of the specific mobject template request with the set of user permissions in order to validate the user profile as permitted to access the data compilation report template;

searching the template database to find the data compilation report template corresponding to the specific mobject template request, and wherein the data compilation report template is associated with a designated mobject template and a set of search parameters;

searching the production database to find a plurality of filled designated mobjects, wherein each filled designated mobject corresponds to the designated mobject template;

searching the production database with the set of specified search parameters to find a plurality of corresponding filled ditem sets, wherein each corresponding filled ditem set is associated with one of the filled designated mobjects;

retrieving all the sets of filled ditem sets, if the user profile is validated as permitted to access the designated mobject template and the ditem templates associated with the designated mobject template;

processing the corresponding filled ditem sets to produce a data table, wherein each of the corresponding filled ditem sets constitutes one row of the data table; and returning the data table to the central module as a result of the specific mobject template request.

6. The method as claimed in claim 1 comprising the steps of:

providing that each ditem template comprises a set of value verification rules;

comparing the user input value of each ditem template of the specific mobject template to the value verification rules of each ditem template in order to determine if the user input values are valid; and storing each filled ditem in the production database, if the user input values are valid.

7. The method as claimed in claim 1 comprising the steps of:

providing that each ditem template and each mobject template comprises a set of display rules; and rendering each relevant filled ditem with the relevant mobject template on the rendered mobject page according to the set of display rules of the relevant filled ditems and the set of display rules of the relevant mobject template.

8. The method as claimed in claim 1 comprising the steps of:

associating a plurality of runtime-filled ditem values with each filled ditem and with the filled mobject through the central module.

9. The method as claimed in claim 1, wherein each ditem template is a template for a control field on a web form, and wherein each ditem template comprises a value attribute, a label attribute, a set of validation attributes, and a set of display processing attributes.

10. The method as claimed in claim 1, wherein each mobject template is a template for visually displaying a specified set of data, and wherein each mobject template comprises a plurality of GUI render attributes, a plurality of runtime metadata attributes, a plurality of runtime processing instructions, a title attribute, a label attribute, and an annotation attribute.

11. The method as claimed in claim 1 comprising the steps of:

receiving input through the GUI of the template builder module from the administrator account to define the plurality of programmatic objects.

12. The method as claimed in claim 1 comprising the steps of:

defining each of the plurality of programmatic objects as a plurality of extensible markup language (XML) templates with the template builder module; and storing the plurality of XML templates in the template database.

* * * * *